(12) United States Patent
Maguire et al.

(10) Patent No.: US 9,900,425 B1
(45) Date of Patent: Feb. 20, 2018

(54) MOBILE DEVICE MONITORING SYSTEM

(71) Applicants: Michael Maguire, Ambler, PA (US); Michael Varanka, Amherst, NJ (US)

(72) Inventors: Michael Maguire, Ambler, PA (US); Michael Varanka, Amherst, NJ (US)

(*) Notice: Subject to any disclaimer, the term of this patent is extended or adjusted under 35 U.S.C. 154(b) by 0 days.

(21) Appl. No.: 15/335,293

(22) Filed: Oct. 26, 2016

Related U.S. Application Data

(63) Continuation-in-part of application No. 14/883,562, filed on Oct. 14, 2015.

(60) Provisional application No. 62/394,172, filed on Sep. 13, 2016, provisional application No. 62/412,236, filed on Oct. 24, 2016.

(51) Int. Cl.
  *H04M 1/00* (2006.01)
  *H04M 1/725* (2006.01)
  *H04B 1/3888* (2015.01)
  *H04M 1/60* (2006.01)
  *G08B 3/10* (2006.01)
  *G08B 5/38* (2006.01)

(52) U.S. Cl.
  CPC .......... *H04M 1/72577* (2013.01); *G08B 3/10* (2013.01); *G08B 5/38* (2013.01); *H04B 1/3888* (2013.01); *H04M 1/6075* (2013.01)

(58) Field of Classification Search
  CPC ............ H04M 1/72577; H04M 1/6075; H04B 1/3888
  USPC .......................................... 455/575.1, 575.8
  See application file for complete search history.

(56) References Cited

U.S. PATENT DOCUMENTS

| | | | |
|---|---|---|---|
| 2011/0054789 A1* | 3/2011 | Yoon | B60R 11/0211 701/469 |
| 2013/0163768 A1* | 6/2013 | Salter | H04R 29/00 381/56 |
| 2014/0011471 A1* | 1/2014 | Khosla | H04W 4/02 455/404.2 |
| 2015/0156297 A1* | 6/2015 | Crawford | H04M 1/0262 455/26.1 |
| 2016/0050309 A1* | 2/2016 | Gooberman | H04M 1/72577 455/418 |
| 2016/0241807 A1* | 8/2016 | Kovac | H04N 5/77 |

* cited by examiner

*Primary Examiner* — Raj Chakraborty
(74) *Attorney, Agent, or Firm* — Muskin and Farmer LLC

(57) ABSTRACT

A mobile device case and monitor for discouraging cell device usage (web, texting, voicemail, games, apps, etc.) device during specific activities (while driving, working, at school, etc.) The case has a photodetector inside it and a flash on a cell phone is activated (flashed) and it is determined whether the photodetector detects the flash or not. If the flash is detected, then it is assumed that the cell phone is in the case, while if the flash is not detected then it is assumed that the cell phone is not in the case. If an employee's cell device is not placed inside the case with the lid closed and the employee is on company time, then an alert is generated indicated that the employee is not adhering to corporate procedures.

22 Claims, 21 Drawing Sheets

MOBILE DEVICE MONITORING SYSTEM

CROSS REFERENCE TO RELATED APPLICATIONS

This application is a continuation in part of application Ser. No. 14/883,562, which is incorporated by reference herein in its entirety. This application also claims benefit to U.S. provisional application 62/394,172, which is incorporated by reference herein in its entirety.

BACKGROUND OF THE INVENTION

Field of the Invention

The present general inventive concept is directed to a method, apparatus, and computer readable storage medium directed to a method and system for monitoring and preventing mobile device usage.

Description of the Related Art

Accidents due to cell phone usage while driving (talking, texting, etc.) are a serious problem. It has been reported that 25% of accidents are currently caused by texting while driving.

SUMMARY OF THE INVENTION

It is an aspect of the present invention to provide an improved mechanism to detect a cellular phone or similar device.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

Further features and advantages of the present invention, as well as the structure and operation of various embodiments of the present invention, will become apparent and more readily appreciated from the following description of the preferred embodiments, taken in conjunction with the accompanying drawings of which.

DESCRIPTION OF THE PREFERRED EMBODIMENTS

Figure 1:
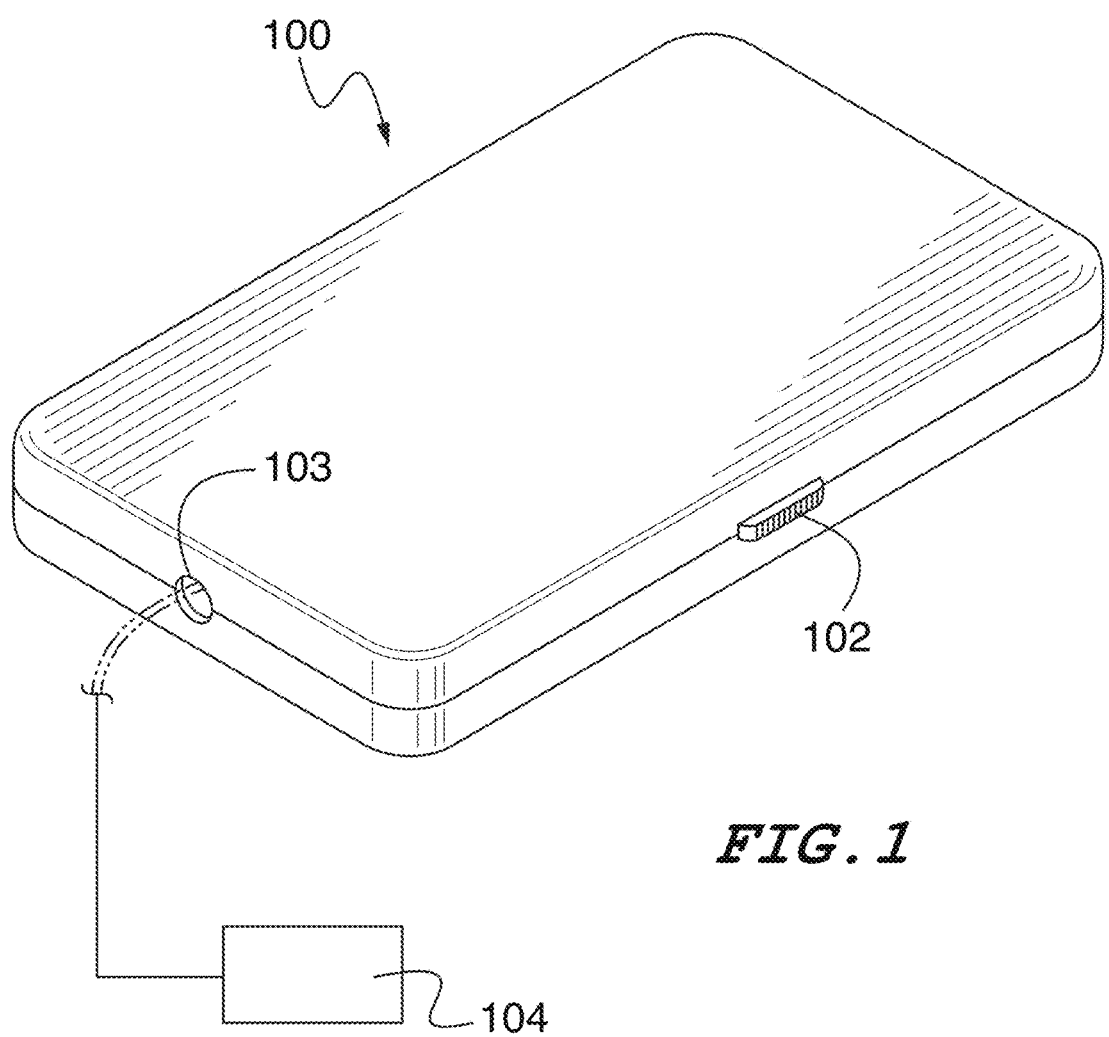
FIG. 1 is a drawing of a closed cell device case, according to an embodiment.

Reference will now be made in detail to the presently preferred embodiments of the invention, examples of which are illustrated in the accompanying drawings, wherein like reference numerals refer to like elements throughout.

The present inventive concept relates to a cell device case which can discourage cell device usage while driving (all the time or during specific time frames). A cell device can be a cell phone (including a smart phone with a touch screen display and IOS or ANDROID (or other) operating system), tablet (with wireless communication capability), smart watch, etc. More particularly, the cell device case can detect when a cell device is placed inside the case and the case is closed. When a cell device is placed inside a closed case, then the cell device can only be used hands-free and cannot be used for visual required functions (texting, etc.) because the owner of the cell device cannot see the cell device or press its buttons. The inventive concept herein detects whether the cell device is or is not in the closed case when the car (or other vehicle) is being operated. It can also be detected when the cell device is not in the closed case when the employee is on business time (e.g., the cell device is elsewhere but not in the closed case). If the vehicle is being operated when the cell device is not secured in the closed case, then an alert is triggered. The system tracks when alerts have been generated and stores them in a database. In this manner, a user who misuses his/her cell device (by using it when operating the vehicle) can be subject to penalties by a party who is monitoring the logs. For example, an employer can maintain logs of all cell device usage while driving and employees who have engaged in this practice may be subject to penalties (e.g., no bonus, etc.) The system can be configured to send alerts to predefined destinations, for example an alert can be transmitted via text, email, etc.

The system described herein can also track device usage during specific time frames, prevent or discourage distracted driving or operating of motorized vehicles, prevent usage during specific time frames as directed by employers, parents, etc. The case can also lock the cell device away from view by others. Thus, the system described herein can enable employers to maintain control of their employees' use of smart devices (e.g., cell phones) during business hours. Parents can also maintain control of their children's smart device usage (all the time or during specific time frames).

FIG. 1 is a drawing of a closed cell device case, according to an embodiment.

A cell device case 100 is in the closed position. A latch 102 is used to open the case. A charging hole 103 is used so that a charging cable cord from a charger 104 can be inserted into the case 100 so that the device (not pictured in FIG. 1) can be charged while it is inside the case 100. The operator can remove the cell device by pressing on the latch 102 and then opening the case. In a further embodiment, instead of the charger being separate from the case 100 the charger can actually be located inside the case 100 and thus the charging hole 103 would not be necessary (however a connection from the charger inside the case may be necessary to the car battery or other external power supply). In an embodiment, a passcode would be required to lock (after the cell device has been placed inside the case) and unlock the latch (to open the case to remove the cell device). The passcode can be a series of numbers or characters which can be spoken or typed into a keypad (not pictured) on the case. Such a locking device on the case is optional and not required. In an embodiment, the case/system won't consider the cell device to be inside the case unless the cell device is inside the case and the locking device is locked. In a further embodiment, a zipper can be used to open/close the case instead of a latch. The zipper can have an electronic detector on it to determine when the case is completely closed (zipped up) and not completely closed (not completely zipped up).

In an embodiment, when the device is placed inside the case and plugged into the charger, the device can sync with the case and thus track the times that the device is secured inside the closed case. Note that in an embodiment, the charger is not required. This time can be transmitted by the case wirelessly to be stored on a remote server (see FIG. 5). In an embodiment, the GPS from the device and the time of day can also be transmitted from the device to the case (thus obviating the need for the case itself to need a GPS and time of day system), although in another embodiment the case would have its own GPS and time of day clock (thus not requiring this data from the device).

In an embodiment, the case can have a lock which can unlock with a physical key, combination, etc. If the case is unlocked (or opened), the case would remain synced with the cell phone.

In an embodiment, when the cell device is inside the closed case the cell device can still integrate with a Bluetooth headset such that the driver of the car can still take calls using a Bluetooth headset ("hands-free") and thus not be considering driving in unsafe conditions. An "app" running on the cell device can be configured as whether to allow the driver to operate the device in hands-free mode or not (while the device is secured inside the closed case). Note that when the cell device is inside the closed case, the cell device is still enabled to operate in any mode which does not require visual inspection by the user. For example, the user can talk hands-free, use voice dialing and calling, use voice enabled apps, the GPS on the cell device can still operate, etc.

Note that the app running on the device would be downloaded and installed like any other app. The app would allow the user (or the user's employer, parent, etc.) to configure the system, for example, specify the frequency of transmissions to the remote server for the log, specify what happens if the user is driving when the cell device is not inside the closed case. For example, the device can be set to ring (or make a noise) when the vehicle is operated while the device is not positioned inside the closed case and the noise will shut off once the cell device is put inside the closed case (or the vehicle becomes stationary).

Figure 2:
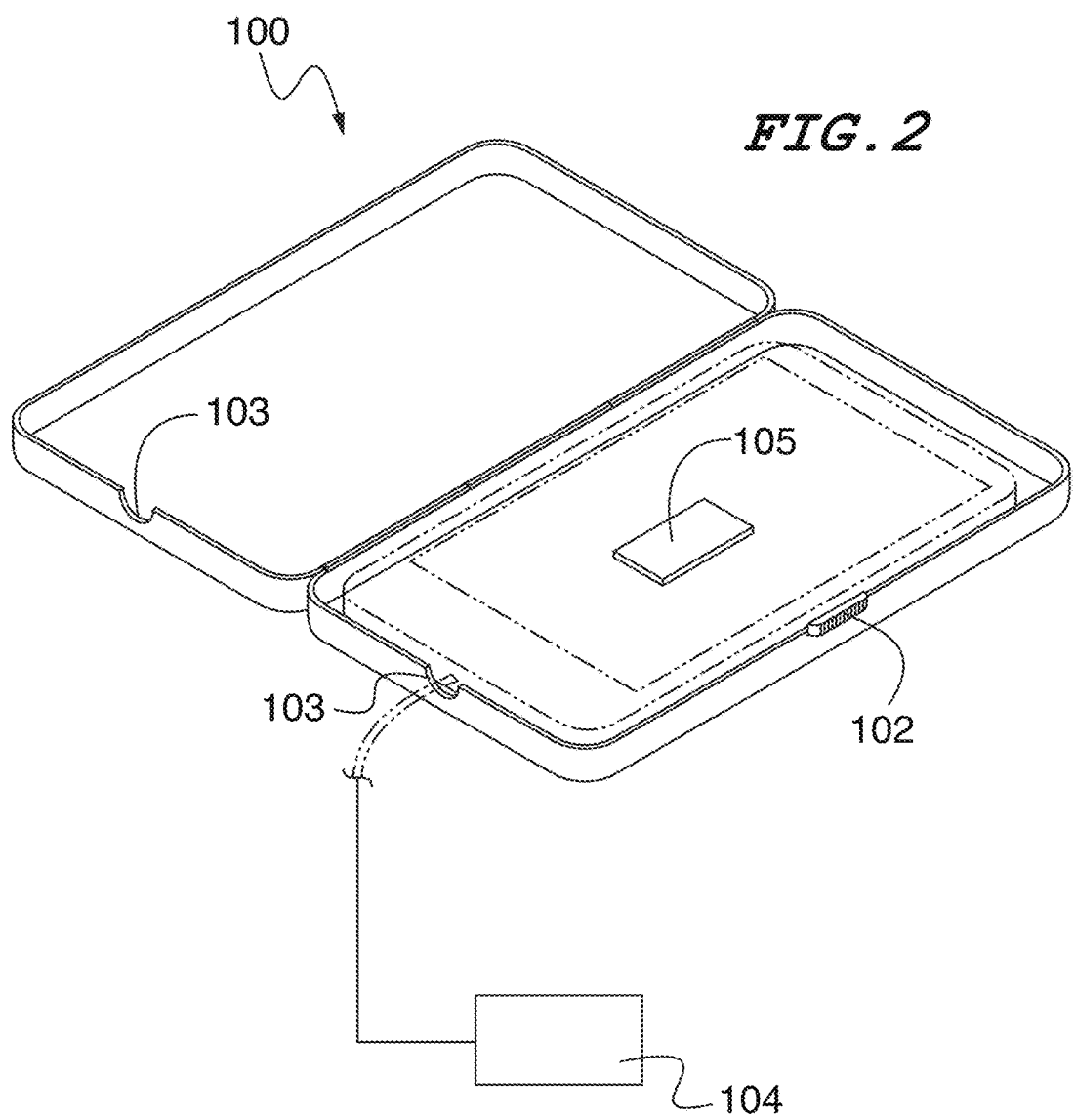
FIG. 2 is a drawing of an open cell device case, according to an embodiment.

FIG. 2 is a drawing of an open cell device case, according to an embodiment.

A sensor 105 is located inside the case which can detect if the cell device is in the case (e.g., by weight). When the cell device case is closed and the cell device is present inside the case is the secured position. When the user operates a vehicle while the cell device is in the secured position, the user cannot operate the cell device (because the cell device is disabled from) using any operation which requires visual inspection and/or physical manipulation and thus is safe. For example, operations which require visual inspection and/or physical manipulation include dialing numbers on keyboard on the cell device, typing anything on a keyboard (real or virtual) such as texting, interacting with a touch-screen, using any app which requires touching the touch-screen or buttons on the cell device, etc. Note that operations which do not require touching or looking at the cell device are still operative, such as voice-dialing and calling (no looking or touching required), apps that require voice control only (e.g., an interactive virtual assistant which speaks and is spoken to). In one embodiment the case serves to disable operations on the cell device which require visual and/or physical touching because the case prevents touching and obstructs vision. In another embodiment, disabled operations are actually disabled on the cell device by an app (program) which runs on the cell device which temporarily disables these operations by instructing the cell device to pause execution of the code for any of these disabled apps until the app terminates these instructions thereby enabling these operations again. The latch also has a sensor can detect whether the case is in the closed position or in the open position.

When the cell device is inside the case it will sync with the device wirelessly device and verifies that the device is actually the correct/specific device. The sync can be done as known in the art. When the charging cable is plugged into the cell device (which means the cell device must be inside the case). Alternatively, the sync between the case and the cell device can be done wirelessly as long as the cell device can be physically verified to be inside the case. Syncing entails that the case verifies the cell device's identity (e.g., confirming a unique identifier (such as a serial number) of the cell device and all relevant data can be exchanged between the case and the cell device. The case can also have access to functions on the cell device such as its GPS, time of day, apps, etc. In an embodiment, the case can initiate a particular app to run and take control of the cell device, such as disable any operation which requires the user to visually look at the cell device. Access to the cell device's GPS can be continuous so the case can continuously monitor and record all of its GPS coordinates without requiring the case to have its own GPS capability. Note that if the case is closed and the device is not in the case, the sensor should detect that no device is present inside the case and record this information. Note that if the system detects device usage while the device is detected as being inside the closed case, then a fraud alert would be triggered and transmitted (and stored on the remote server) that this user has somehow managed to defeat the system. When a cell device is synced to the case the "sync" status is maintained such that the cell device knows it is synced to this particular case and the case knows it is currently synced to the cell device. When the charging cable is unplugged and/or the cell device is removed from the case then the sync is terminated. Note that each cell device can only sync to one case at a time. If there are multiple cases within the vicinity and the sync is accomplished wireless (instead of via a cable such as a charging cable) then the cell device would only sync to one case only. If the cell device is currently synced to a device then it would not be able to sync to another case unless it was de-synced from the case it is currently synced to. In addition to the cell device syncing with the case, the cell device can also sync with other devices simultaneously such as the car itself (e.g., so hands-free calls can be channeled through the car's speakers, etc.) The sync is typically between the case and the phone and does not terminate when the phone is removed from the case (unless the phone is positioned so far away from the case that the two cannot communicate which would result in an "unsync" or "unpair").

In another embodiment, when the device is placed inside the case the device can be connected to the case but does not necessarily need to be charging (e.g., the case does not have a charging cable plugged in). This connection allows the device to sync with the case and the device would use its battery power (the case would have its own battery too which provides the case its power).

Figure 3:
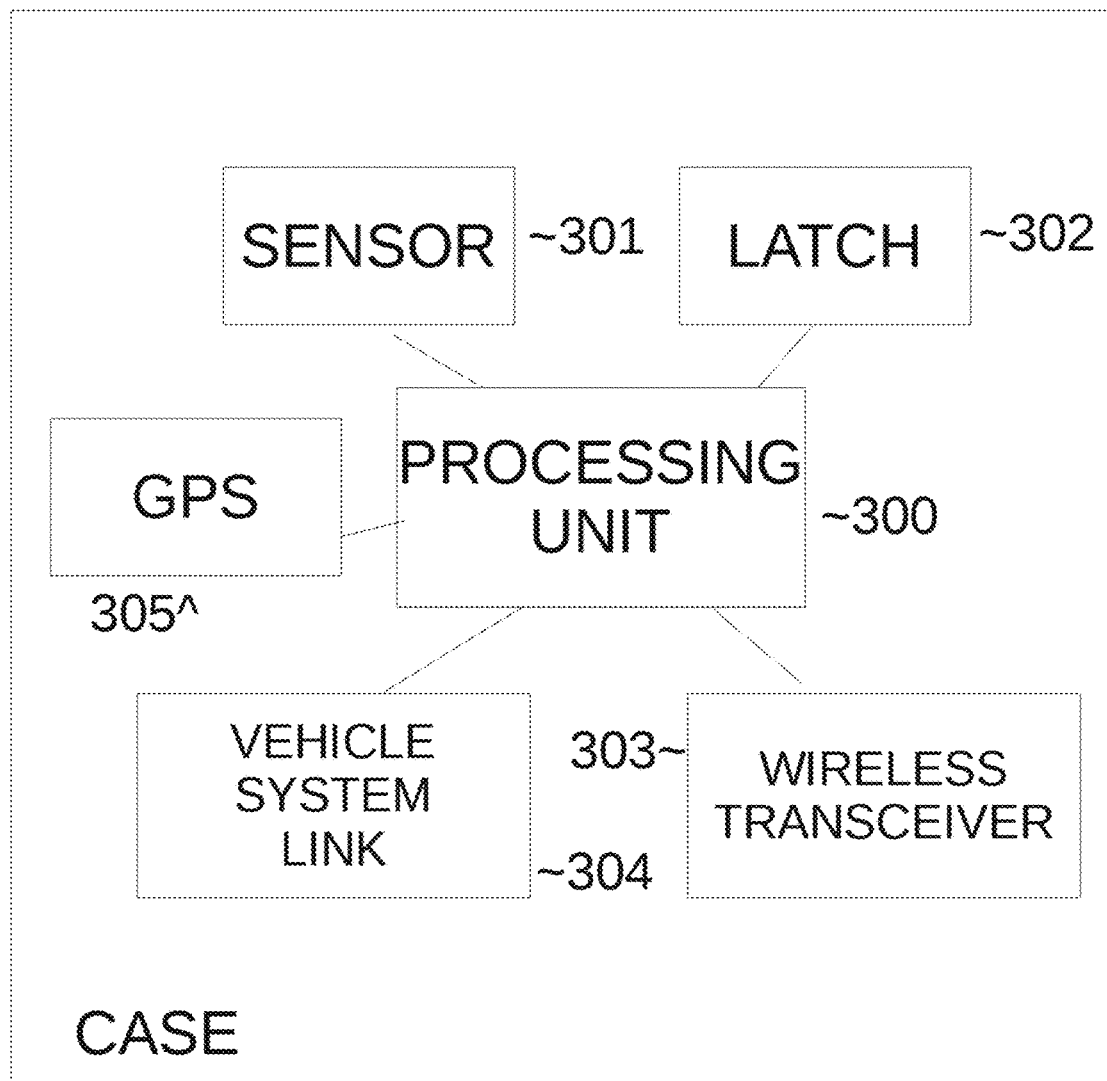
FIG. 3 is a block diagram of a cell device case, according to an embodiment.

FIG. 3 is a block diagram of a cell device case, according to an embodiment.

Inside the case is a processing unit 300 which is a microprocessor. Also inside the case is a sensor 301 which detects when the device is placed inside the case. The sensor 301 can be one of a number of types of sensors, such as a scale which detects a weight of an object placed on top of it (so that if a device placed over the sensor 301 is of at least a particular weight then it can be determined that it is a cell device). The sensor 301 can alternatively be an optical sensor which detects light so that if a cell device is placed over the sensor 301 then it is determined that the cell device is inside the case. The sensor 301 can also be a wireless communication device (such as a Bluetooth device) which can communicate wirelessly with the cell device to verify the cell device's identity (the wireless communications can only take place at very short distances thus confirming that the cell device is actually inside the case). A latch 302 is used to open the case and also can detect when the case is open and closed, and the latch 302 can generate an electrical signal indicating whether the case is open or closed. Also inside the case is a GPS 305 which can detect the location of the case using global positioning satellites. A wireless transceiver 303 enables data to be communicated to and from the internet wirelessly (e.g., using a cellular data connection). In this manner, data representing the state of the case (e.g., open or closed) and vehicle usage can be transmitted wirelessly to a remote database (e.g., the remote server). A vehicle system link 304 can connect the processing unit 300 to the vehicle's transmission so that it can be determined which gear the car is in (park, drive, reverse, etc.)

The processing unit 300 is connected to (and can communicate with) the sensor 301, latch 302, wireless transceiver 303, vehicle system link 304 and the GPS 305. Note that the processing unit 300 inside (or on) the case implements an entirely functional computer system. Thus, the case can perform numerous functions, which include (but not limited to) syncing with the device (and transfer relevant data from the device to the case), utilize the device's GPS receiver to determine the devices location (if this is done then the separate GPS 305 hardware would not be needed), communicate with the vehicle (via the vehicle system link) to determine which gear the car is currently in. The case (via the processing unit) can perform any needed function in order to accomplish any and all of the functions described herein. All data regarding the status of the cell device (e.g., times operated, whether vehicle is being operated, whether cell device is in case, etc.) is uploaded to a remote server (can be stored permanently or automatically deleted after a predetermined amount of time). The processing unit 300 is also connected to any other apparatus/device needed to carry out any other operation described herein. The processing unit 300 can also be connected to a random access memory and/or a non-volatile long-term storage memory. The processing unit 300 can execute code stored on the RAM or long-term storage memory which is programmed to implement any of the operations described herein that the case can perform.

Figure 4:
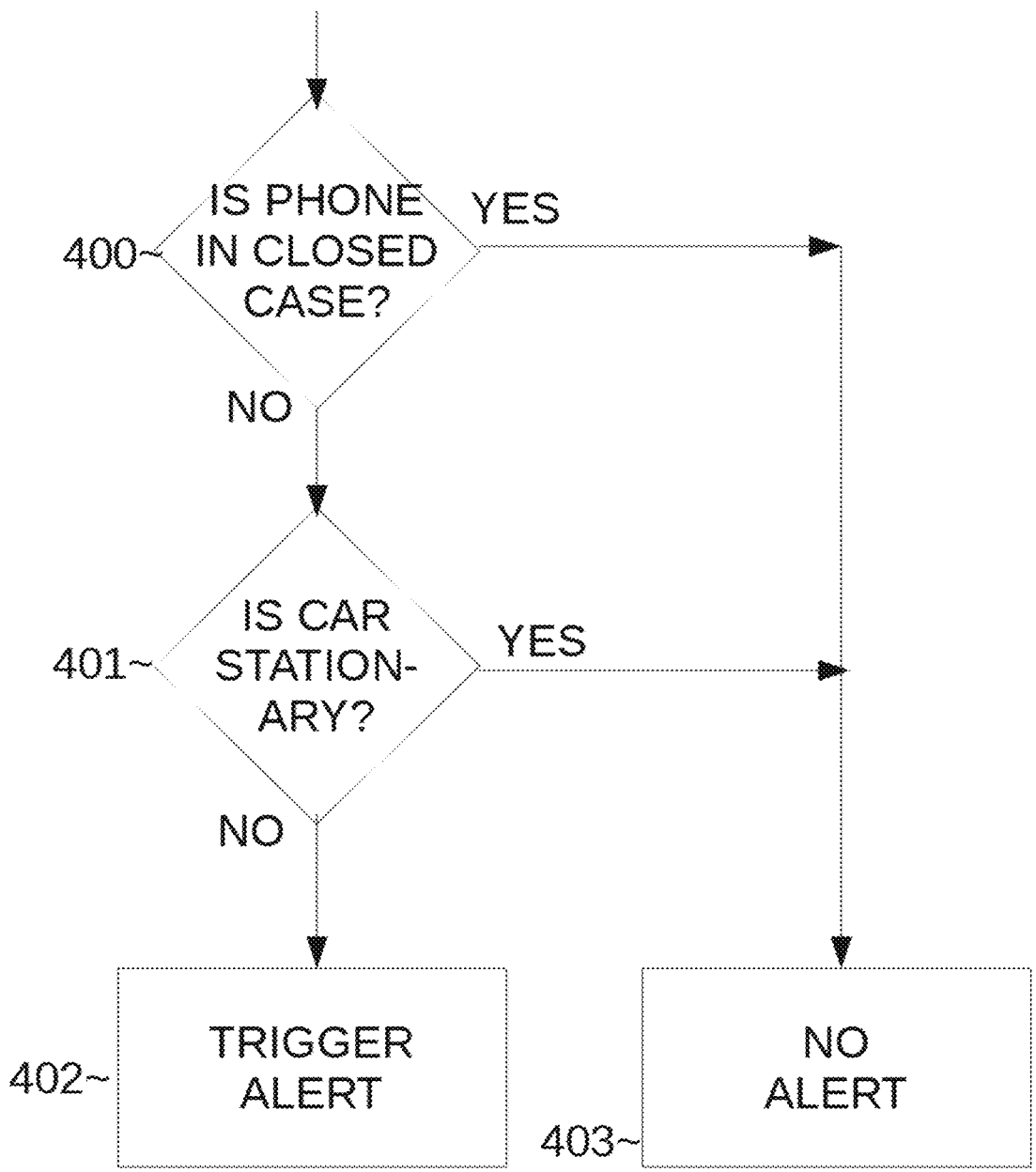
FIG. 4 is a flowchart illustrating a method of determining alerts, according to an embodiment.

FIG. 4 is a flowchart illustrating a method of determining alerts, according to an embodiment.

In operation 400, it is determined whether the device is in a closed case. This can be determined by determining if the sensor is being activated (an object is put on top of the sensor) and if the door is closed (by checking the latch). If both the sensor is activated and the latch is in the closed position then the case is closed with a device inside. If the case is closed with a device inside, then the method proceeds to operation 403.

If in operation 400, the device is not in a closed case (e.g., the device is not in the case or the device is in the case but the case is open) then the method proceeds to operation 401.

In operation 401, it is determined whether the car (vehicle) is stationary. This can be determined in numerous ways by a vehicle status detector. For example, a GPS signal can be used to determine whether the car is moving or stationary (for example, if the current location of the GPS device inside the vehicle changes at a velocity representative of motion of a vehicle, then it would be concluded that the vehicle is in motion otherwise the vehicle can be considered stationary). In this embodiment the vehicle status detector is a circuit which has its own GPS functionality or can access GPS functionality on another device which determines whether the vehicle is in motion or not by monitoring GPS coordinates over time. In another embodiment, the processing unit 300 is connected to the vehicle system link 304 which can receive a signal from the car's transmission unit to determine which gear the car is currently in. If the car is in park then this is considered stationary. If the car is not in park (e.g., reverse, or drive) then this would be considered moving. In this embodiment the vehicle status detector is the vehicle system link and the logic to determine and transmit whether the car is in park, drive, etc. If the car is considered stationary, then the method proceeds to operation 403.

If in operation 401, it is determined that the car is moving, then the method proceeds to operation 402. In operation 402, an alert is triggered. This alert means that the operator of the vehicle is operating the vehicle without the cell device being inside the case in the closed position. This condition is hazardous as the device may ring or receive a text hence distracting the driver while he/she is driving the vehicle.

Thus, an alert is triggered. A signal can be transmitted by the case (using the wireless transceiver 303) to a remote database which stores a log of statuses from the case. In other words, each time operation 402 is reached a signal is transmitted to the remote database indicating the current alert status (that the vehicle is being operated in an unsafe condition), time, date, the device status (that the cell device is not currently in the closed case) and other information which may be option such as the user name (each user of the system has a unique user name to identify that user), location of the vehicle (determined via GPS). Note that an alert can be sent to another party, such as the driver's employer, immediately via a wireless signal so that the other party is alerted to this drivers unsafe driving. The alert can be a text message to another party, such as the driver's boss or employer which also includes an identification of the particular case which caused the alert such as the case's unique identification number or the name of the driver who the case is assigned to.

In operation 403, no alert is generated meaning the vehicle is not being operated in a hazardous manner (the vehicle is stationary or if it is moving the cell device is secured in the case while closed). A signal is still transmitted to the remote database indicating the current status (that the vehicle is being operated in a safe condition), the current time, date, the device status (whether the cell device is placed in the closed case or not), user name, and optionally the vehicle's location (determined using GPS). Note that the case also transmits an identifier of the case and/or the cell device so that the remote server can identify which case and/or cell device the current stream of data is directed to.

Note that the method illustrated in FIG. 4 will continuously repeat, thus generating a continuous log of vehicle status which is stored by the remote database and can be retrieved at any time and viewed. Table I below illustrates one example of a status log which is generated by the method illustrated in FIG. 4 (in conjunction with the remainder of the system described herein). All of the data shown (e.g., date, time, device status, vehicle status, username, etc.) is continuously monitored, recorded, and transmitted to the remote server for storage and later retrieval. The current time can be continuously transmitted or in an embodiment it does not need to be transmitted since the recipient of the data (e.g., the remote server) would know the current time and the delay for such transmissions is small. Any other data described herein (or needed for proper operation) can also be continuously monitored, recorded and transmitted to the remote server as well, such as the usage status of the cell device (whether the cell device is being used and for what purpose (e.g., a call, etc.), the phone numbers called (or number of a caller into the device), the apps being used, whether the case is locked or unlocked, etc. The "continuous" monitoring (and hence transmission and recording) can mean at periodic discrete intervals (e.g., every minute, every 30 seconds, every second, etc.) Data transmitted by the case and stored also includes an identifier of the case and can also include an identifier of the cell device as well. The identifier is a unique code (or number, string, etc.) which uniquely identifies the case and phone so that it is known which case and/or phone the data stream is monitoring (directed to). The Device status "in case" means that the cell device is inside the case (as detected by the sensor or other detection mechanism) and the case is closed (in an embodiment the case would also have to be locked). "Out of case" means that the cell device is not inside the case or that the case is not closed (even though the cell device is inside the case), or in an embodiment the case is not locked even though the cell device is inside the case. The system can be configured to set what conditions are required for the device status to be in the case and what conditions are required for the device to be out of the case.

TABLE I

| Date | time | device status | vehicle status | username |
| --- | --- | --- | --- | --- |
| Sep. 1, 2015 | 12:00 am-09:03 am | out of case | stationary | Jack Smith |
| Sep. 1, 2015 | 09:03 am-09:04 am | in case | stationary | Jack Smith |
| Sep. 1, 2015 | 09:04 am-10:15 am | in case | driving | Jack Smith |
| Sep. 1, 2015 | 10:15 am-10:16 am | in case | stationary | Jack Smith |
| Sep. 1, 2015 | 10:16 am-3:27 pm | out of case | stationary | Jack Smith |
| Sep. 1, 2015 | 03:27 pm-05:03 pm | in case | driving | Jack Smith |
| Sep. 1, 2015 | 05:03 pm-11:59 pm | out of case | stationary | Jack Smith |
| Sep. 2, 2015 | 12:00 am-09:05 am | out of case | stationary | Jack Smith |
| Sep. 2, 2015 | 09:05 am-10:20 am | in case | driving | Jack Smith |
| Sep. 2, 2015 | 10:20 am-10:22 am | out of case | driving | Jack Smith |
| Sep. 2, 2015 | 10:22 am-11:59 pm | out of case | stationary | Jack Smith |

Note that on Sep. 2, 2015 at 10:20 am to 10:22 am the cell device was out of the case while the vehicle was being operated. This would have triggered an alert which was (optionally, depending on the embodiment being implemented) transmitted to a party in order to take some action. For example, this alert could be transmitted to the driver's employer who may call the driver's cell device to call him to put away the device (or stop driving the car). An audible alarm (such as a beeping noise) located in the car can also be activated as well in response to this alert in order to notify the driver to stop driving while the device is not secured in the closed case.

Note that the username can be determined in numerous ways. In one embodiment, each case itself is assigned a username by the employer (or other administrator of the system). In another embodiment, the name comes from the cell device itself during the sync between the device and the case (the sync can either be through the charging cable or wireless). Note that this sync can also validate the device to make sure that a "dummy" device is not utilized. For example, the system can be programmed to expect a particular device for a particular case. If the user tries to use a different device, the device identification will be identified by the case (during a sync) and will not be validated (because it will not match the ID of the device that is supposed to be used for the respective case). The case itself or the remote server (which then gets transmitted to the case) would store the ID (a unique identifier) for the device. If a different device is inserted into the case, then this would trigger a special alert to the user's employer alerting them to the fact that a foreign device has been inserted into the case (this data would also appear in the log for this case as well).

Note that the determination of whether the user is operating the cell device when the car (also referred to as "vehicle herein") is in operation can be determined locally by the case (and transmitted to the remote server) or remotely at the remote server (or other computer accessing data at the remote server). For example, if the remote server stores a continuous stream of data indicating the time, whether the cell device is in the case or not, and the location coordinates of the case, then it can be determined later at time at which times the cell device was not in the case when the car was in motion (by seeing at which times the car was in motion and the cell device was not present in the case at that time).

Figure 5:
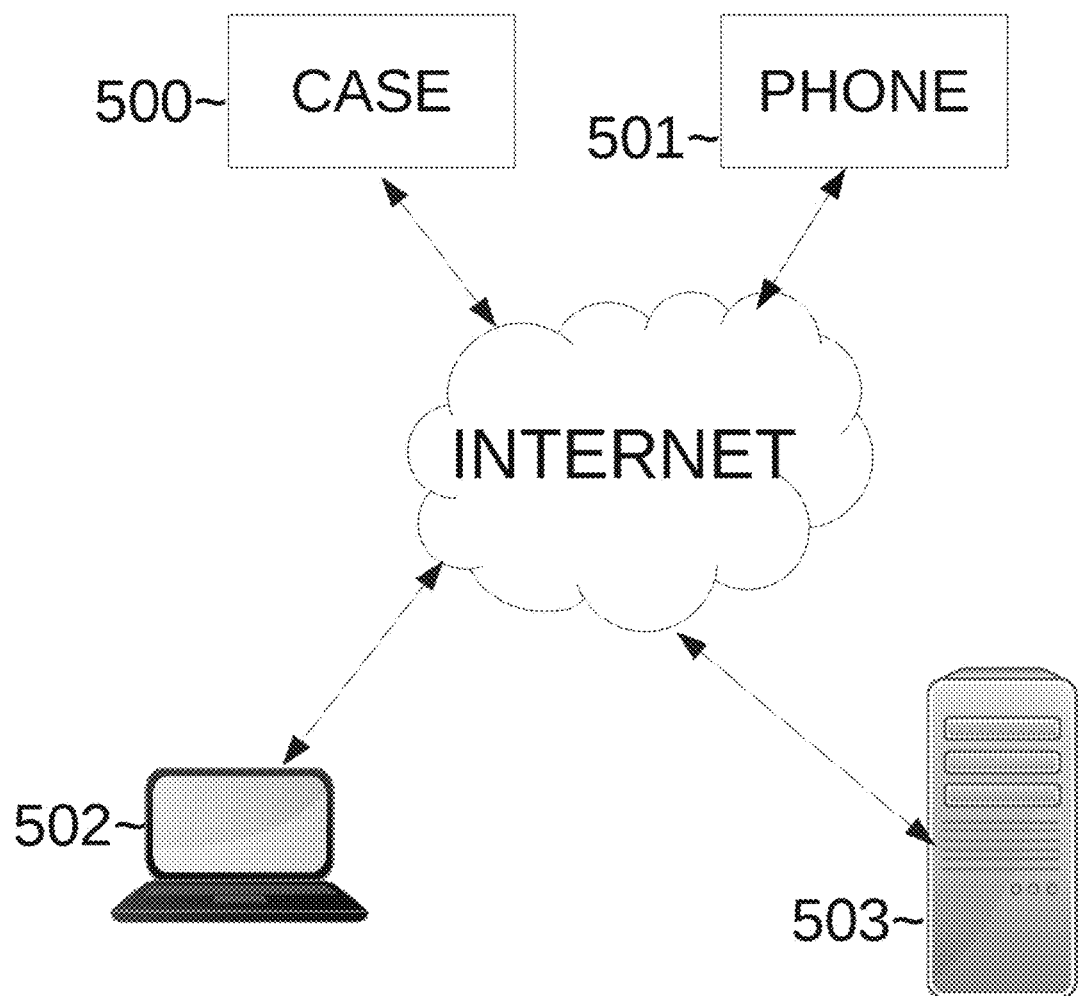
FIG. 5 is a block diagram illustrating different parts of the overall system, according to an embodiment.

FIG. 5 is a block diagram illustrating different parts of the overall system, according to an embodiment.

The case 500 has its own wireless transmitter which can communicate independently with the internet (and hence a remote server 503). The device 501 also can communicate wireless with the internet (and hence the remote server 503). The remote server 503 is a server that communicates wireless with the case 500 and the device 501. The remote server 503 stores a log of statuses of each case such as illustrated in Table I. A computer 502 (such as a personal computer, laptop, etc.) can be used to connect to the internet to access the data on the remote server 503. In this manner, an employee of a company that the driver works for can log into the remote server 503 and view all of the logs for all of the cases owned by the company. The remote sever 503 can run an SQL (or other) database so a person can log in and retrieve only the information they wish to retrieve (e.g., they may want to pull up data for a particular user (e.g., Jack Smith) on a particular date). The remote server 503 can also generate a report of all drivers who were non-compliant (drove at least once without their cell device being secured inside the closed case) for a specified period of time.

The remote server 503 can also provide a real time tracker for any case registered to a particular employer. For example, an employer at any time can log into the remote server 503 and check on the status of a particular case (e.g., its location, open or closed with device status, vehicle stationary or moving status, etc.) The remote server 503 can be programmed (by storing computer readable instructions on a memory which is executed by a microprocessor on the remote server 503) to perform any of the operations described herein which can be performed by the server 503.

In a further embodiment, the invention described herein is not limited to being used on a vehicle. It can be used in other contexts where distractions from cell devices should be avoided. For example, it can be utilized for children at school (during class they would be required to keep their cell devices in their closed cases), babysitters or day care workers (should also keep their cell devices in their closed cases while on the job), air traffic controllers, lifeguards, emergency operators, etc. The system can be programmed with particular times and if the cell device is not in the case in those particular times then an alert can be triggered. For example, the system can be programmed that a student has a class at 1 pm to 3 pm every Thursday, and if the cell device is not put inside the case on those times then an alert can be triggered (e.g., to the school, the student's parents, etc.) if the cell device is put inside the case during those times then the alert would not be triggered.

Previously discussed was utilizing a sensor 105 to determine (see operation 400) whether the phone is currently in the close case. In an embodiment, the sensor can be one or more photodetectors (A photodetector is a mechanism which can detect light, and can be any suitable such mechanism, including a photodiode, photoresistor, phototube, photovoltaic cell, etc.) When the cell phone is supposed to be in the closed case, the cell phone can be given a signal to activate the cell phone's flash (which is typically used for the phone's camera although it can have other uses as well). If the photodetector detects a light at the exact point in time that the flash was activated (and no light before and/or after the flash was activated), then it can be concluded that the cell phone (also referred to as phone) is in the case. If the photodetector does not detect the appropriate light signal(s) during an activation of the cell phone's flash, then it can be concluded that the phone is not in the case.

Figure 6:
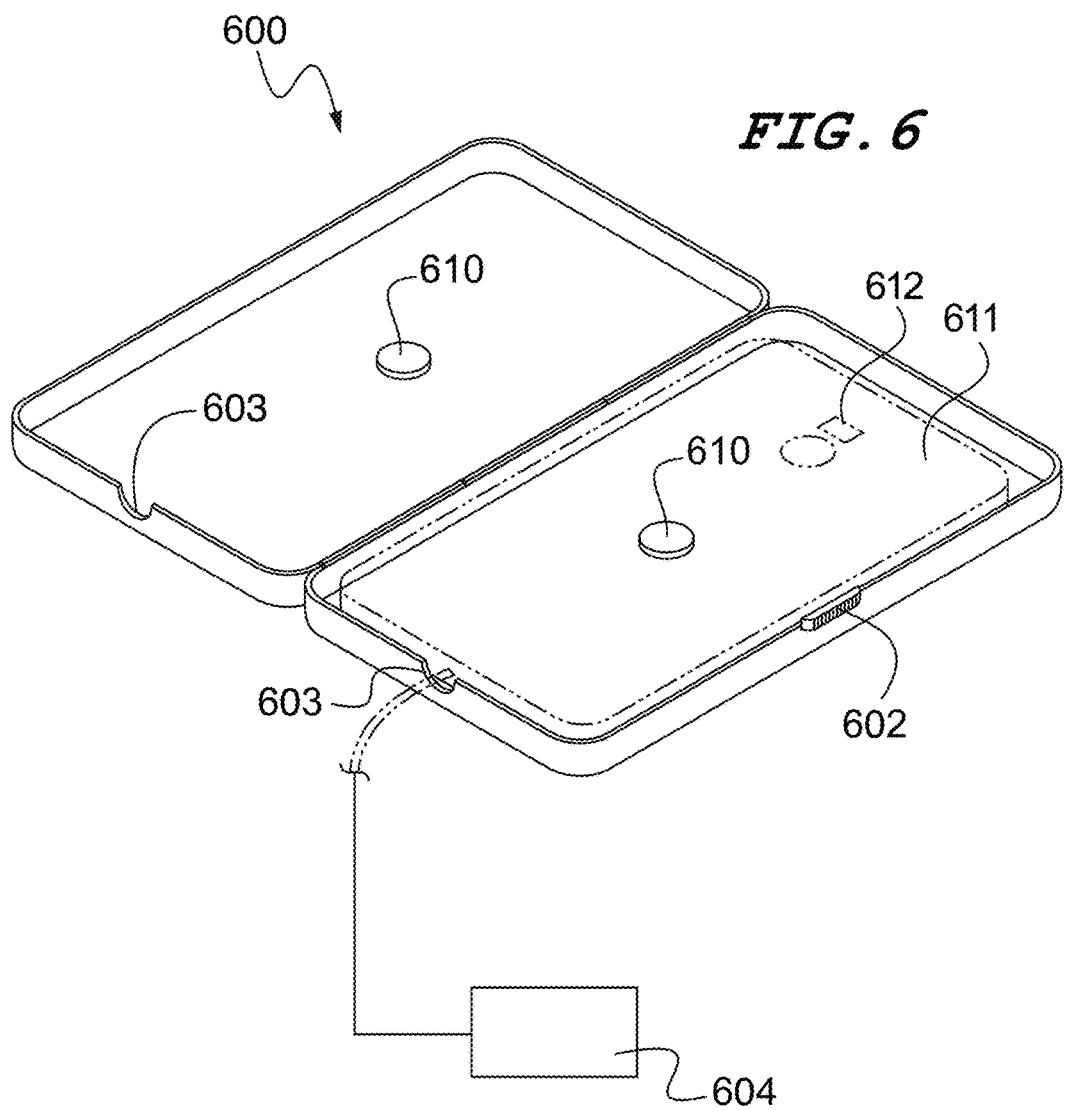
FIG. 6 is a drawing of an open cell phone case with a photodetector inside the cell phone case, according to an embodiment.

FIG. 6 is a drawing of a cell phone case with a photodetector inside the cell phone case, according to an embodiment. The cell phone case 600 is shown in its open position although it can also be closed as well.

The cell phone case 600 has two photodetectors 610, although there can be any number of photodetectors (e.g., 1 to 10) located in any location(s) on the inside of the cell phone case 600. While not pictured in FIG. 6, wires connect the photodetectors 610 to a processing unit. The processing unit would activate the flash 612 on the cell phone 611 and receive the signals from the photodetectors 600 to determine whether or not the cell phone is inside the case or not.

A latch 602 is the same as latch 102 and can be used to open the case. A charger 604 can be used to charge the cell phone (see charger 104). A charging hole 603 can be used to pass a charging cable through the case 600 (see charging hole 103). The charging cable can also be used for other purposes besides charging, such as to pass any kind of data from the phone to an outside processing unit (as opposed to transmitting it wirelessly).

When the case 600 is closed, the photodetector(s) 610 should not sense light (or sense a very low level of light). By activating the flash 612 on the cell phone 611, the photodetector(s) 610 would then (for a brief period of time) detect light (or detect light level above a particular threshold. After the flash has flashed, the photodetector(s) 610 would then detect the absence of light (or sense a very low level of light). In this manner, it can be detected whether or not the cell phone 611 is actually inside the case 600 when it is closed.

Figure 7:
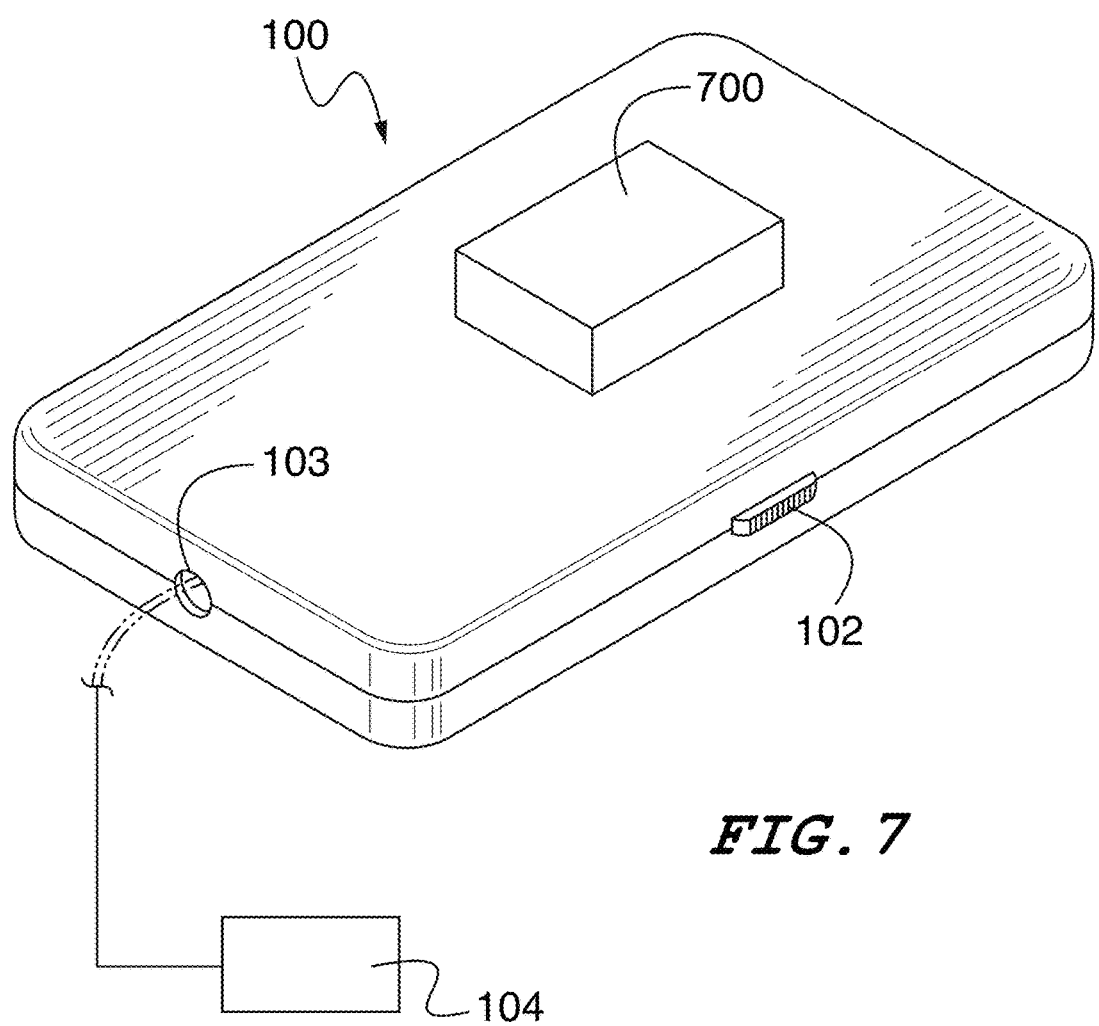
FIG. 7 is a drawing of a closed cell phone case with a photodetector inside the cell phone case, according to an embodiment.

FIG. 7 is a drawing of a closed cell phone case with a photodetector inside the cell phone case, according to an embodiment.

Figure 13:
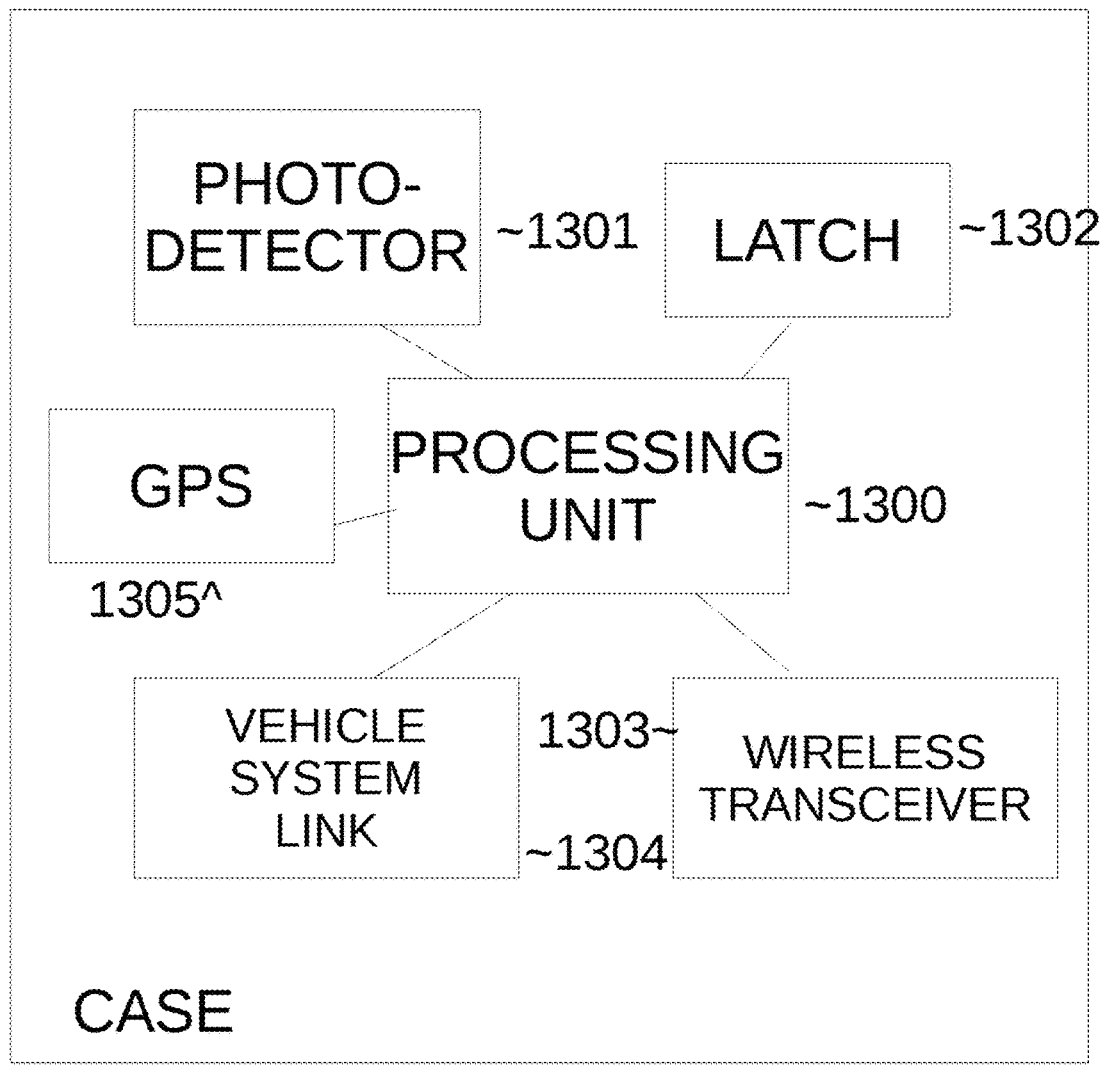
FIG. 13 is a block diagram of a cell phone with a photodetector inside the cell phone case, according to an embodiment.

A case processing system housing 700 can house the case processing system shown in FIG. 13 and described herein, and/or any electronics used by the case (which can include the case processing unit 1300 and any other electronic components). The case processing system/case processing unit would control the one or more photodetector(s) by sending signals to activate them (if not already activated), receive signals from the photodetector(s) such as what the photodetector(s) have detected, etc. The case processing system/case processing unit, in one embodiment, can also control the flash on the cell phone (e.g. activate it so that it flashes). The case processing system housing 700 (and its contents) can be located anywhere on the outside or inside of the case 100.

A light burst can be detected by monitoring a change in the light detected from the photodetector from a low light level to a high light level. Optionally, positively detecting a light burst can also require the light level (after it changes from low to high) to then change back to a low level of light (this prevents the case when a user opens the case at the exact same time that the flash is activated).

In one embodiment, the photodetector continuously monitors for a light burst (a flash of a camera's flash). When a light burst is detected, a signal is then transmitted from the photodetector to the case processing unit (and/or other processing unit located elsewhere).

Figure 8:
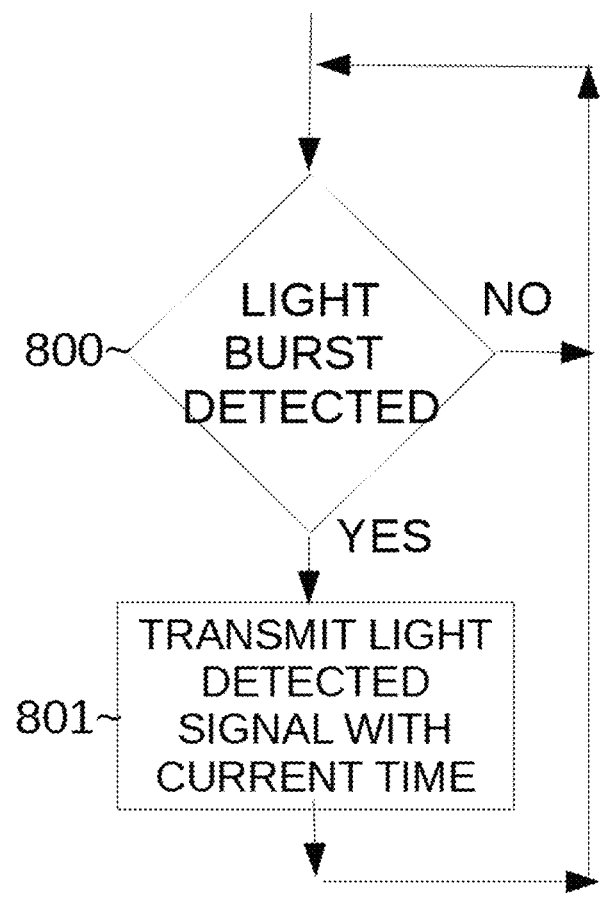
FIG. 8 is a flowchart illustrating an exemplary method of continuously monitoring a photodetector, according to an embodiment.

FIG. 8 is a flowchart illustrating an exemplary method of continuously monitoring a photodetector, according to an embodiment.

In operation 800, it is determined whether a light burst is detected by the photodetector. To positive detect a light burst, the light level must go from low level of light to high level of light (representing the activation of the flash). If a change from a low light level to high light level does not occur, then the operation returns a "no" (no light burst detected). Optionally, the detecting also would require the light level to then go back to low level (after the flash activation has completed and the flash is turned off) in order to return a positive light burst detection, and if this change back to low level is not detected (even if a detection from low light level to high light level is detected) then the operation would return that no light burst is detected.

If no light burst is detected in operation 800, then the method repeats at operation 800 and continuously is monitoring for a light burst.

If in operation 800, a light burst is detected, then the method proceeds to operation 801, which transmits a light detected signal along with the current time. A light detected signal is an analog or digital signal communicating the occurrence of the light burst from operation 800. The light detected signal can be transmitted to the case processing unit and/or any other processing unit located elsewhere).

Figure 9:
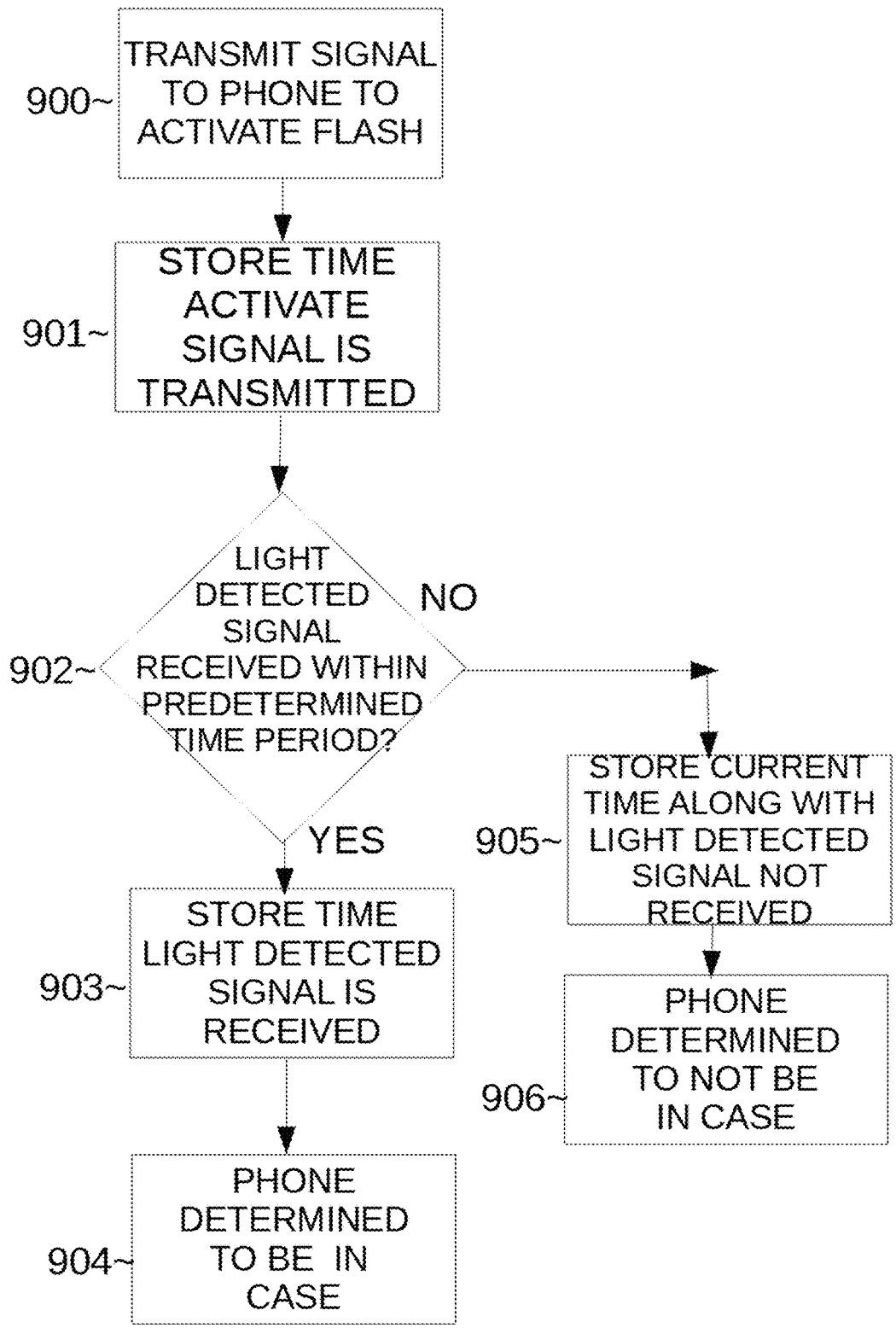
FIG. 9 is a flowchart illustrating an exemplary method of determining whether a cell phone is in a cell phone case, according to an embodiment.

FIG. 9 is a flowchart illustrating an exemplary method of determining whether a cell phone is in a cell phone case, according to an embodiment. The method illustrated in FIG. 9 is intended to operate simultaneously with the method illustrated in FIG. 8. In other words, FIG. 8 is continuously running (the photodetector is continuously monitoring for a light burst). FIG. 9 is a method which will determine whether or not the phone is located inside the case using the photodetector (or other type of sensor/detector inside the case). The method illustrated in FIG. 9 can be implemented by any processing unit, such as by an app running on the cell phone itself, on the case processing unit, or on a remote server in communication with the cell phone and/or the case processing unit, or any combination of different processing units.

In operation 900, an activate flash signal is transmitted to the phone to activate the phone's flash. An app can be running on the cell phone which is programmed to receive the activate flash signal and then instructs the cell phone's flash to activate (flash).

From operation 900, the method proceeds to operation 901, which stores the time that the activate flash signal is transmitted. This can be stored on a storage unit associated with any processing unit (e.g., cell phone, case processing unit, remote server).

From operation 901, the method proceeds to operation 902, which determines whether a light detected signal is received within a predetermined time period from the time the activate flash signal is transmitted (in operation 900). The predetermined time period can be any relatively short time period which is long enough to complete the cycle of the activate flash signal (operation 900) and receiving the light detected signal, and can be for example 3 seconds or any other amount of time (e.g., 0.1 seconds to 60 seconds or more). While time stamps are optional if time stamps are used then the time stamps are used for the activate signal transmission and the light detected signal received (the latter can be subtracted from the former) to determine whether the time difference is under the predetermined time period. If no time stamps are used then the light detected signal must be detected within a predetermined amount of time from the activate signal transmission (operation 900). So in other words, if the predetermined amount of time is one second, then after the transmit signal to activate the cell phone flash (operation 900) then a light detected signal must be received within a second to result in a positive outcome ("yes" in operation 902) otherwise it results in a negative outcome ("no" in operation 902). The predetermined amount of time (e.g., one second) is the time allowed for the signals to be transmitted and processed (for example if the signal(s) are being transmitted over a wireless network then there may be some latency). Note that the method in FIG. 8 should typically be running continuously so whenever there is a light burst detected (flash) it will generate and transmit a signal to the processing unit which is implementing operation 902.

If in operation 902, the light detected signal is received within the predetermined time period, then the method proceeds to operation 903, which stores the time the light detected signal is received (this step is optional). This can be stored on any computer readable storage medium associated with any processing unit so a log of events can be generated.

From operation 903, the method proceeds to operation 904 which returns an analog or digital signal representing that the phone is determined to be in the case.

In operation 902, of there is no light detected signal received within the predetermined time period, then the method proceeds to operation 905, which stores the time the current time (hence the time at which it is determined that the phone is not in the case since no light detected signal was received). This step is optional. This can be stored on any computer readable storage medium associated with any processing unit so a log of events can be generated.

From operation 905, the method proceeds to operation 906, which returns an analog or digital signal representing that the phone is determined to not be in the case.

Figure 10:
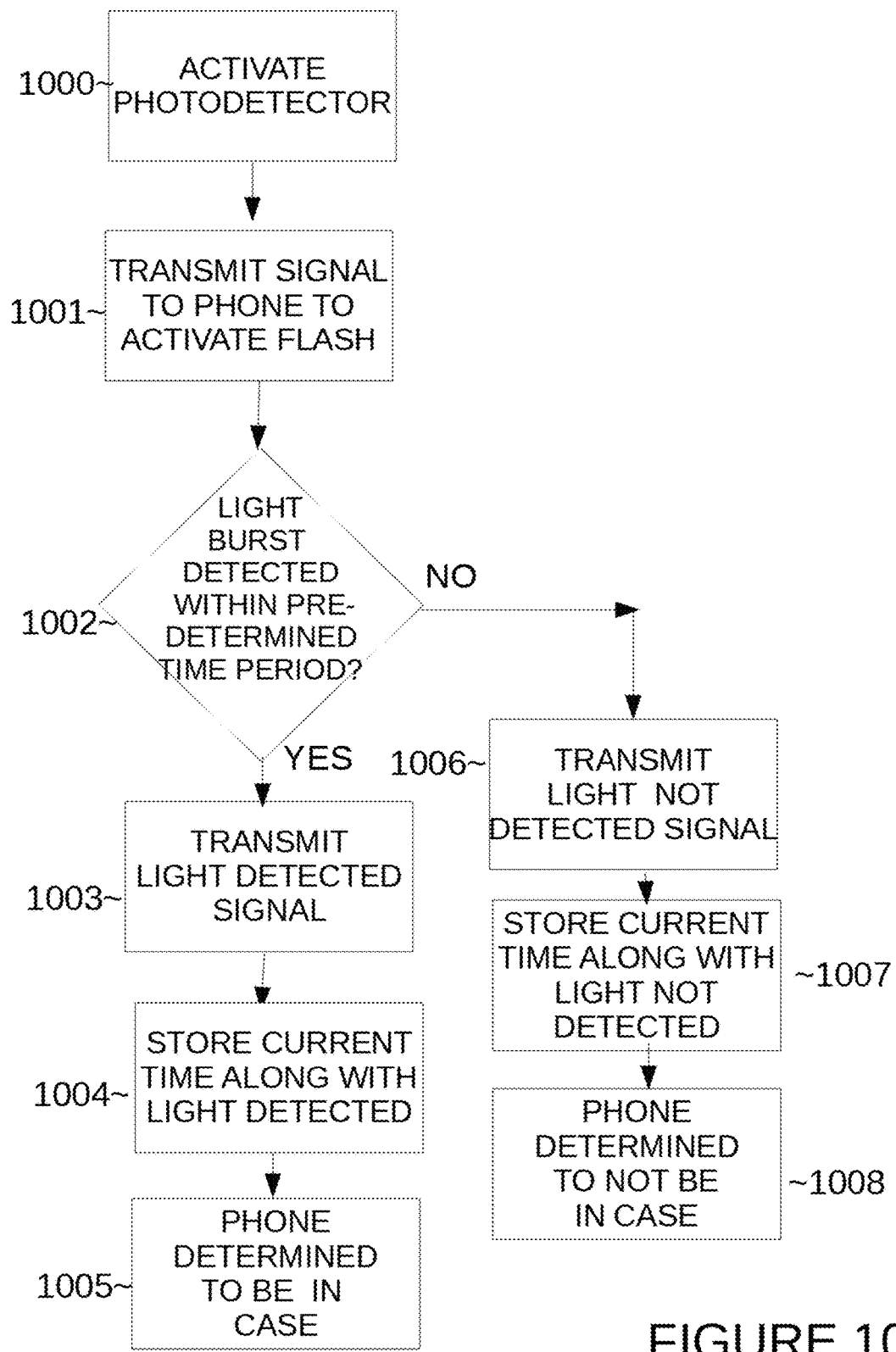
FIG. 10 is a flowchart illustrating another exemplary method of determining whether a cell phone is in a cell phone case, according to an embodiment.

FIG. 10 is a flowchart illustrating another exemplary method of determining whether a cell phone is in a cell phone case, according to an embodiment. FIG. 10 is a method similar to FIG. 9 but does not require the method in FIG. 8 to be continuously performed. In other words, the photodetector does not have to be continuously on and detecting but is activated only when needed. This may possibly conserve power. FIG. 10 is performed when a determination is to be made whether or not the cell phone is in the case.

In operation 1000, the photodetector is activated. This can be performed by sending a signal (analog or digital) to the photodetector (or circuit controlling the photodetector) to begin detecting light. When the photodetector is not active, it can be considered in a "sleep" mode and is not actively detecting. The photodetector will begin detecting light and run for a predetermined period of time (e.g., 0.1 seconds to 60 seconds or more). If a light burst is detected within that period of time, then the photodetector will transmit a signal (analog or digital) indicating that a light burst was detected. If after the predetermined period of time expires and no light burst was detected, then the photodetector will transmit a signal (analog or digital) indicated that no light burst was detected. Thus, the photodetector will ultimately transmit one of two possible signals: 1) a light burst detected; 2) a light burst not detected. In another embodiment, only a light burst detected signal will be transmitted and if no light burst is detected then the photodetector will not transmit any signal at all. After the signal is transmitted, the photodetector can go back into the sleep mode.

From operation 1000, the method proceeds to operation 1001, which transmits a signal to the phone to activate the phone's flash. Depending on the embodiment being implemented, the signal can originate from an app running on the phone itself, from the case processing unit, from a remote server, or any other processing unit.

From operation 1001, the method proceeds to operation 1002, which determines whether a light burst is detected within a predetermined time period from when the signal to activate the phone flash was transmitted (operation 1002). The predetermined time period is a relatively short period of time (e.g., 0.1 second to 60 seconds or more) which gives the signals enough time to transmit and be received (if signals are being transmitted over a wireless network then of course there can be some latency).

If in operation 1002, a light burst detected signal is received within the predetermined time period, then the method proceeds to operation 1003, which transmits a light detected signal to any processing unit (depending on the embodiment being implemented), such as an app running on the cell phone itself, the case processing unit, a remote server, or any other processing unit.

From operation 1003, the method proceeds to operation 1004, which stores the current time (hence the time at which it is determined that the phone is in the case). This step is optional. This can be stored on any computer readable storage medium associated with any processing unit so a log of events can be generated.

From operation 1004, the method proceeds to operation 1005, which returns an analog or digital signal representing that the phone is determined to be in the case.

If in operation 1002, no light burst signal is detected within a predetermined period of time, then the method proceeds to operation 1006. Alternatively (in another embodiment), if a light burst not detected signal is detected, then the method proceeds to operation 1006.

In operation 1006, a light not detected signal is transmitted to any processing unit (depending on the embodiment being implemented), such as an app running on the cell phone itself, the case processing unit, a remote server, or any other processing unit.

From operation 1006, the method proceeds to operation 1007, which stores the current time (hence the time at which it is determined that the phone is not in the case). This step is optional. This can be stored on any computer readable storage medium associated with any processing unit so a log of events can be generated.

From operation 1007, the method proceeds to operation 1008, which returns an analog or digital signal representing that the phone is determined to not be in the case.

Figure 11:
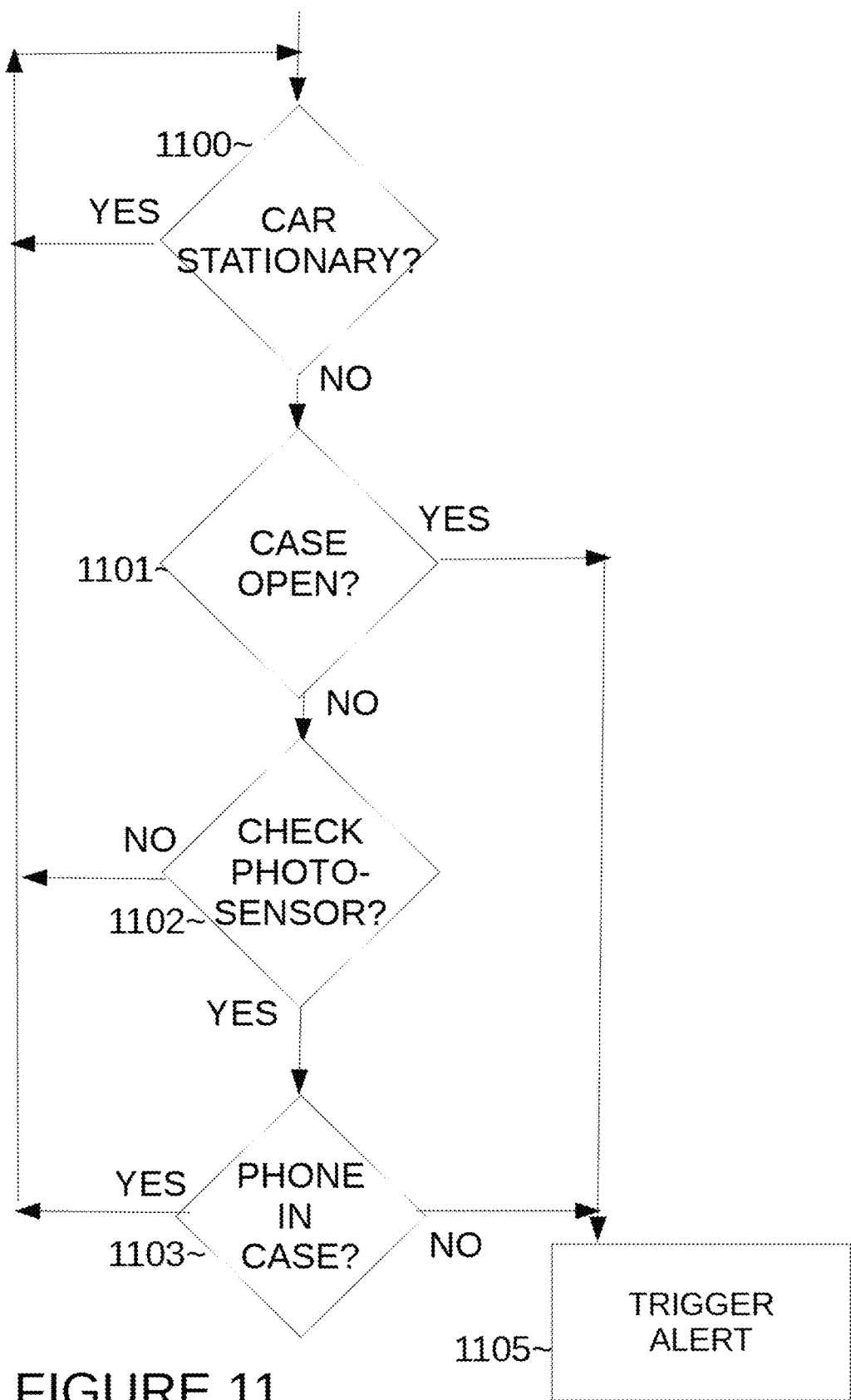
FIG. 11 is a flowchart illustrating an exemplary method of determining alerts, according to an embodiment.

FIG. 11 is a flowchart illustrating an exemplary method of determining alerts, according to an embodiment. Note that this method can continuously repeat, thus generating a log of continuous status updates (which can all be stored on a computer readable storage medium).

In operation 1100, it is determined whether the car is stationary or not. This can be determined as described in operation 401 (e.g., GPS data, etc.) If the car is stationary, then the method can return to operation 1100 which continues monitoring. This is because in an embodiment, if the car is stationary then the user is permitted to use his cell phone.

If in operation 1100, it is determined that the car is not stationary, then the method proceeds to operation 1101, which determines whether the case is open. This can be determined as described herein. For example, there can be a latch which can be in an open position (when the case is open) and a closed position (when the case is closed). Whether the latch is in the open or closed position is a mechanical function depending on whether the case is open or closed. An electronic detector can detect whether the latch is in the open or closed position and send a corresponding signal. If the case is open, then the method proceeds to operation 1105 (which triggers an alert).

If in operation 1101, the method proceeds to operation 1102, then the method proceeds to operation 1102, which determines whether to check the photodetector to determine whether the phone is in the case. FIG. 11 is continuously repeating and continuously activating the phone's flash would quickly drain the battery. Therefore, activating the phone's flash and checking the photodetector can be done sparingly. There are numerous ways to spread out activating the camera's flash (thus proceeding to operation 1103). For example, the method can proceed to operation 1103 (activating the camera's flash) based on a time period, such as every 20 minutes (or other predetermined time amount). For example, the camera's flash would be activated, then 20 minutes would pass and then the camera's flash would be activated again, then 20 minutes would pass and the camera's flash would be activated again, and so on. Alternatively, the method can proceed to operation 1103 based on a random determination. For example, every second that goes by, if a random number from 1 to 1000 (or other number) equals 1 then the method would proceed to operation 1103. Thus, in effect in the long run this would average to checking the photodetector every 16.66 minutes. Alternatively, operation 1103 can be implemented after a predetermined distance has been driven, for example every five miles the vehicle containing the case with the cell phone inside has driven the method would then proceed to operation 1103 to check the photodetector. Alternatively, any other method can be used as well which results in that "once in a while" the method would proceed to operation 1103 but most of the times it would skip operation 1103 and return to operation 1100 to continue checking for violations. If operation 1102 determines not the proceed to operation 1103 (e.g., it will proceed to operation 1103 every five minutes and five minutes has not elapsed yet since the last time operation 1103 was executed), the method would return to operation 1100.

If in operation 1102, it is determined to proceed to operation 1103, then the method proceeds to operation 1103 and determines whether the phone is in the case utilizing the phone's flash and the photodetector(s) in the case. The method of FIG. 9 (along with FIG. 8 continuously operating) or FIG. 10 can be used to determine in operation 1103 whether the phone is still in the case.

If in operation 1103, it is determined that the phone is in the case, then the method can return to operation 1100 which continues monitoring the case and the vehicle.

If in operation 1103, it is determined that the phone is not in the case, then the method can proceed to operation 1105, which triggers an alert. This can be done as described in operation 402. When an alert is triggered, data representing that an alert was generated along with the time it was generated is stored on a log file which is stored on a computer readable storage medium (stored on any processing unit, such as the cell phone itself, the case processing unit, or the remote server).

Figure 12:
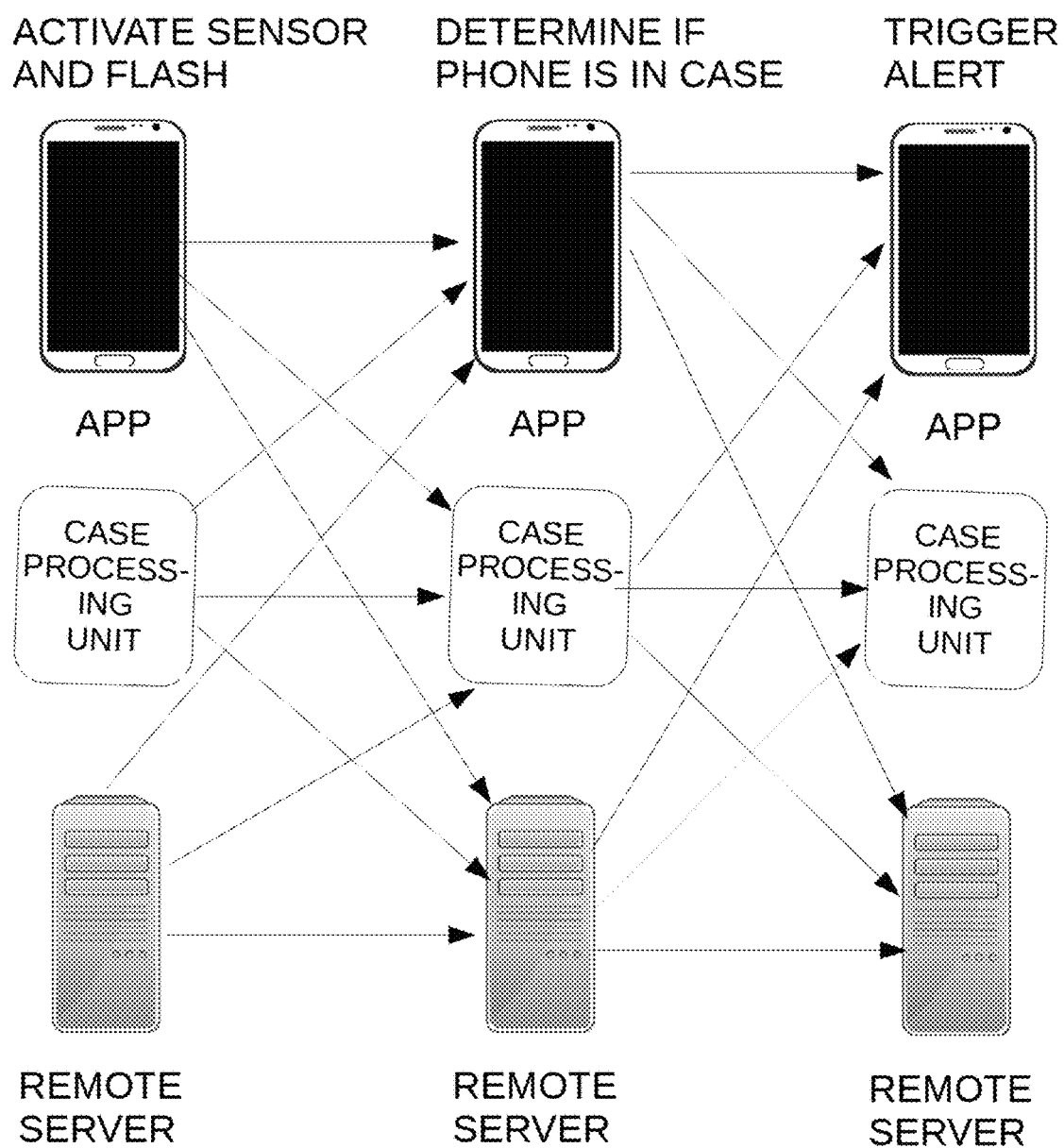
FIG. 12 is a diagram illustrating the distributed tasks that different processing units can implement, according to an embodiment.

Note that an "app" can be installed on the cell phone which is programmed to perform all of the tasks described herein, and hence can perform all of the tasks described herein. The app is in communication with the case processing unit and the remote server. The case processing unit is in communication with the app and the remote server. And the remote server is in communication with the app and the case processing unit. All of the tasks in any of the methods described herein can be divided among these three processing units in any manner. FIG. 12 illustrates how all of these tasks can be split up in any manner among the three different processing units (and in fact, each of these three processing units can be split up into further processing units).

FIG. 12 is a diagram illustrating the distributed tasks that different processing units can implement, according to an embodiment.

The operations of activating the sensor (e.g., photodetector) and the flash, determining if the phone is in the case (as described herein), and triggering an alert (as described herein) can be performed by any combination of the processing units. Note that the sensor may not need to be activated if the continuous embodiment is being implemented (e.g., FIG. 8 is continuously running). Note that other operations not illustrated in FIG. 12 can also be performed by any processing unit. Note that activating and sensor and activating the flash can also be performed by any two different processing units as well.

FIG. 13 is a block diagram of a cell phone case with a processing system (including a photodetector) inside the cell phone case, according to an embodiment. FIG. 13 is the same as FIG. 3 but with a photodetector as the sensor. The other components, such as the processing unit 1300, latch 1302, GPS 1305, vehicle system link 1304, and wireless transceiver 1303 are the same as their counterparts in FIG. 3. While not shown, the processing unit 1300 (which can be a microprocessor) can also be connected to any combination of a ROM, RAM, storage device (and non-transitory readable/writable computer readable storage medium), network connection, etc. The processing unit 1300 can also be connected to a port which connects to a cell phone output device (e.g., the screen) and also a cell phone input device (e.g., buttons on the cell phone, cell phone touch-screen, etc.) The processing system 1300 can basically be considered a separate computer and can be located in the case processing system housing 800. As used herein, communicating with the case processing unit (shown in FIG. 13) is also synonymous with communicating with the processing unit 1300 shown in FIG. 13.

Figure 14:
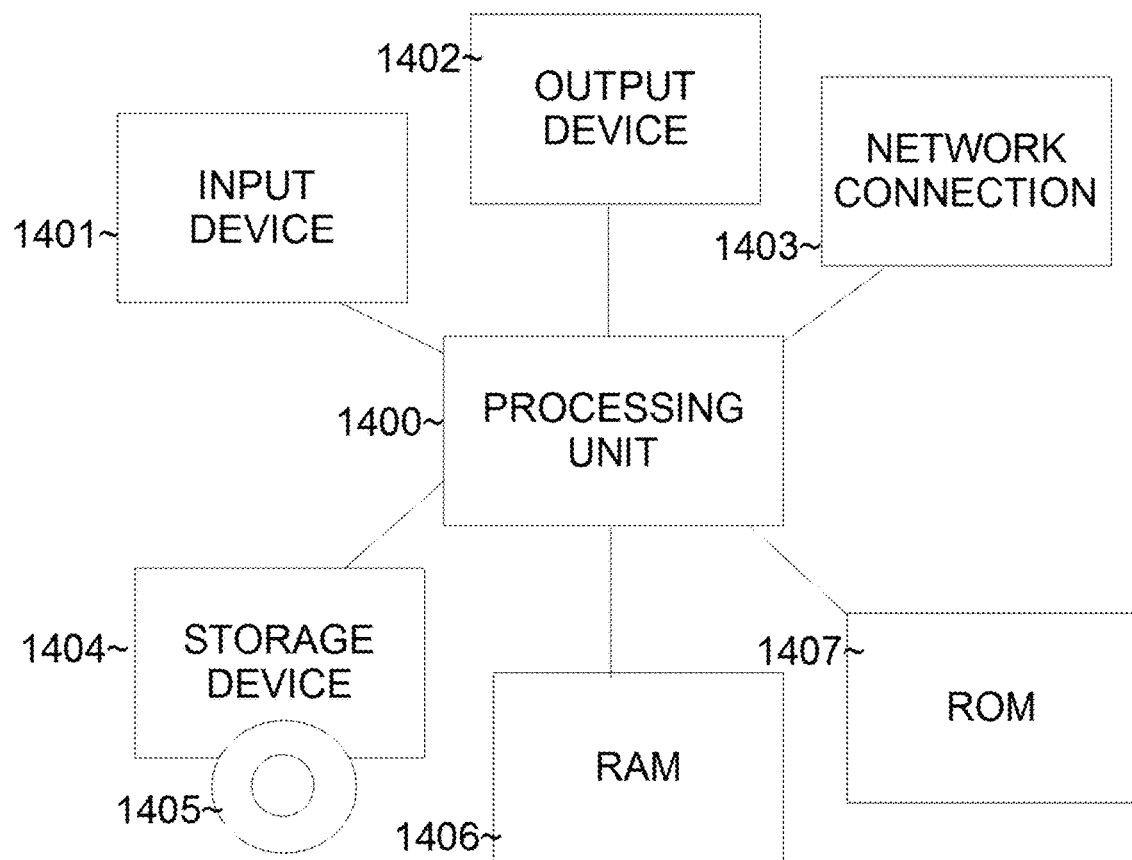
FIG. 14 is a block diagram illustrating a computer, according to an embodiment

FIG. 14 is a block diagram illustrating a computer, according to an embodiment. The computer illustrated in FIG. 14 can be utilized as a remote server, cell phone, case processing unit, database, or any other computer mentioned herein or needed for operation of the entire system.

A processing unit 1400 (such as a microprocessor and any associated components such as bus, cache, power supply, etc.) is connected to an output device 1402 (such as an LCD monitor, touch screen, CRT, etc.) which is used to display to a user any output/state of the system, and an input device 1401 (e.g., buttons, a touch screen, a keyboard, mouse, etc.) which can be used to input from the user any parameter. Multiple such processing units 1400 can also work in collaboration with each other (in a same or different physical location). All methods described herein can be performed by the processing unit 1400 by loading and executing respective instructions. The processing unit 1400 can also be connected to a network connection 1403, which can connect to a computer communications network such as the Internet, a LAN, WAN, etc., and exchange any information described herein to another processing unit (e.g., communicate to and from). The processing unit 1400 is also connected to a RAM 1406 (used by the processing unit 1400 for temporary storage) and a ROM 1407 (which can be used to store permanent data such as operating systems, etc.) The processing unit 1400 is also connected to a storage device 1404 which can be a DVD-drive, CD-ROM, flash memory, etc. A non-transitory computer readable storage medium 1405 can store a program which can control the electronic device to perform any of the methods described herein and can be read by the storage device 1404. The non-transitory computer readable storage medium 1405 can also store any type of data described herein and can be used by a database to store and retrieve information (such as the logs, etc.)

While one processing unit is shown 1400, it can be appreciated that one or more such processor can work together (either in a same physical location or in different locations) to combine to implement any of the methods described herein. Programs and/or data required to implement any of the methods/features described herein can all be stored on any non-transitory computer readable storage medium (volatile or non-volatile, such as CD-ROM, RAM, ROM, EPROM, microprocessor cache, etc.)

Figure 15:
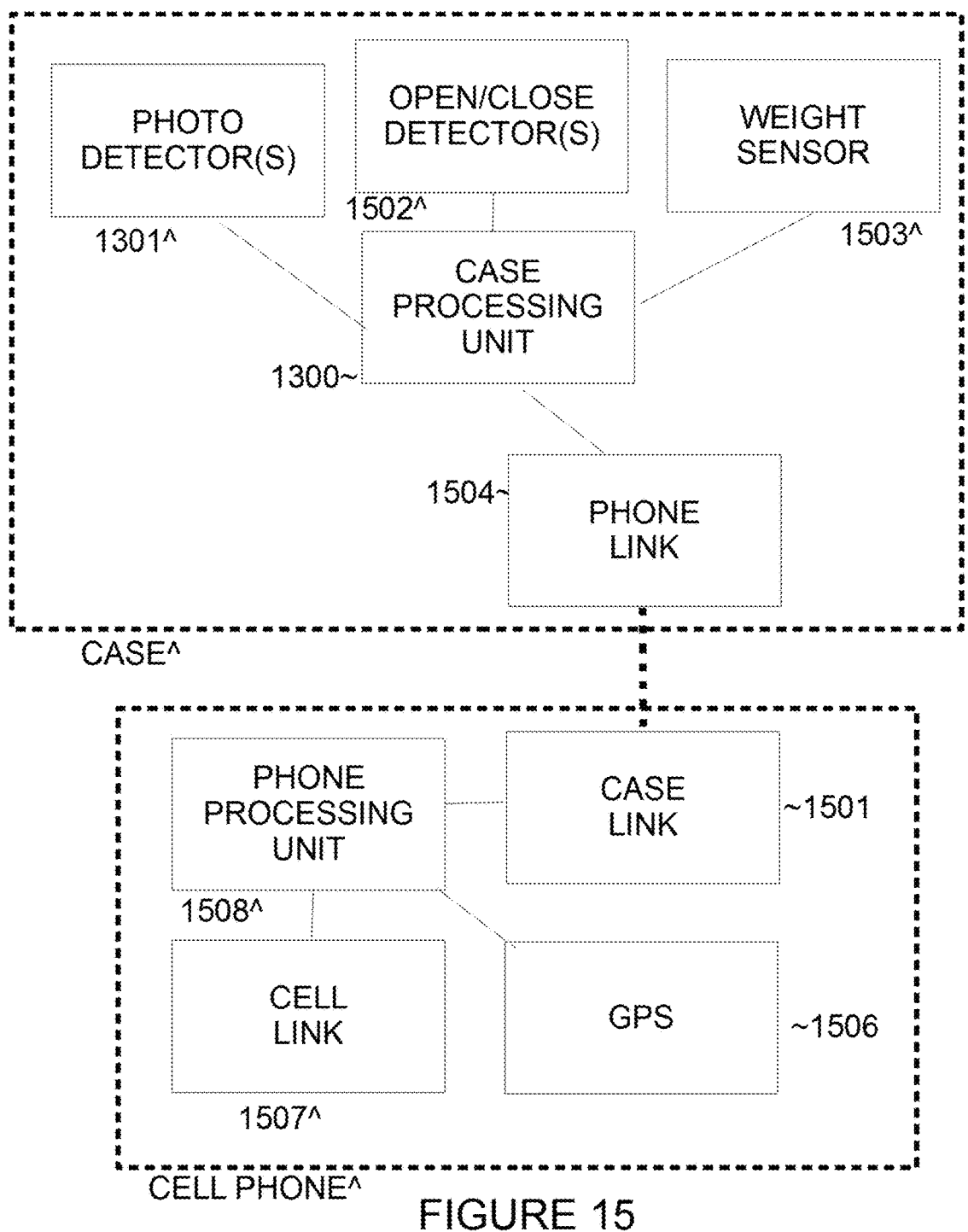
FIG. 15 is a block diagram illustrating a cell phone paired to a case, according to an embodiment.

FIG. 15 is a block diagram illustrating a cell phone paired to a case, according to an embodiment.

The block marked "CASE" comprises a case processing unit 1300 which can be a processing unit as described herein. The case processing unit 300 can also be connected to a photo detector(s) 1301 and open/close detector(s) 1502. The open/close detector(s) 1502 can be the latch 302. The latch 302 can have an electrical switch which is closed (or opened) when the latch 302 is opened (which is required to open the case) thereby triggering an electrical signal when the case is opened. The open/close detector(s) 1502 can be any other mechanism which can determine when the case is opened from the closed position, for example another photosensor (when opened, light will be detected by the photosensor and result in a signal representing that the case is opened). The open/close detector(s) 1502 can be one or more pair(s) of magnets and magnetic switches (e.g., magnet detectors) which would detect of the magnet is in close proximity with the corresponding magnetic switch. The magnet and the magnetic switch can be located in fixed positions such that when the case is closed they will be in close proximity with each other and therefore the magnet would be detected by its corresponding magnetic switch and hence the case would be determined to be closed. If the magnet is not detected by its corresponding magnetic switch then the case could be determined to be open. If more than one set of magnets/magnetic switches are used, for example two sets of a magnet and corresponding magnetic switch, then both magnetic switches would have to detect their corresponding magnet in order for the case to be determined to be closed otherwise the case would be determined to be opened (e.g., if one or both magnetic switches do not detect their corresponding magnet).

The case processing unit 1300 can also be connected to a weight sensor 1503. The weight sensor 1503 can be, for example, a spring loaded sensor that when a phone is placed inside the case will push the sensor down and close (or open) an electrical circuit, thereby signifying that there is a phone inside the case. The spring for the weight sensor should have a particular spring constant in order for it to be properly triggered when a cell phone is placed inside the case but would not generate any "false positives" by being triggered when something much lighter is placed into the case.

The case processing unit 1300 can also be connected to a phone link 1504, which can implement a wireless communication protocol (e.g., blue tooth) which can communicate with a cell phone. The phone link 1504 would typically have to be "paired" with the cell phone (or more particularly, a case link 1501) so the case and the cell phone can communicate securely. The pairing process typically entails each party (the cell phone and the case) verifying the identity of the other and establishing each other's IP addresses or frequencies, etc., so packets can be communicated therebetween. Pairing is known in the art.

The case can also have a display unit which can be a series of LEDs on the outside of the case so an operator can view them while the case is closed. The LEDs can reflect a current status of the case. For example, a yellow LED would only light to indicate that the battery inside the case (which powers the case) is low. A green LED would only light to indicate that the case has a cell phone which is paired and secured properly inside the case, meaning it is safe to drive. A red LED would only light to indicate that a paired cell phone is not secured inside the case and thus it is not safe to drive.

The block marked "CELL PHONE" is the cell phone which would be placed inside the case. The cell phone would comprise a phone processor unit 1508 (which is a processing unit as described herein (e.g., microprocessor, etc.) connected to a case link 1501. The case link 1501 is what would be paired to the phone link 1504 and serves as the communication bridge between the case and the cell phone. Typically a cell phone would be paired to only one case and the case would be paired to only one cell phone. The case link would utilize the same communication mechanism as the phone link (e.g., Bluetooth) and transmit their packets to and from each other utilizing Bluetooth technology.

The phone processing unit 1508 is also connected to a GPS 1506 so that the cell phone can detect when the phone (and hence the vehicle the cell phone is in) is in motion. The case can receive the GPS data (e.g., current location, etc.) from the GPS 1506 wirelessly via the phone link 1504/case link 1501 so that the case can determine whether the cell phone (and hence case) are in motion. Motion can of course be detected when the location of the cell phone changes by greater than a predetermined amount over time (e.g., positions changes more than 10 feet every 5 seconds or other such parameters). The phone processing unit 1508 is also connected to a cell link 1507 which is a communications mechanism to a cellular network and hence the internet. All modern cell phones typically have the capability to transmit/receive data wirelessly to and from the internet via such a cell link, which communicates wirelessly with cell towers.

As such, the system illustrated in FIG. 15 enables the case to utilize the cell phone's link to the internet so that the case can communicate to/from the internet wirelessly by going through the phone link 1504. In other words, by virtue of the case being paired with the cell phone (via the phone link 1504/case link 1501), the case can now communicate with the internet without having to have its own cell link. Thus, the case can determine whether the cell phone and case are in motion by receiving location data from the GPS 1506. The case can also transmit data to remote services via the cell phone using its cell link 1507, so that if an alert occurs, the case can transmit the alert data to a remote server (e.g., time of the alert, phone identification, location of cell phone (using the GPS data), etc.)

Figure 16:
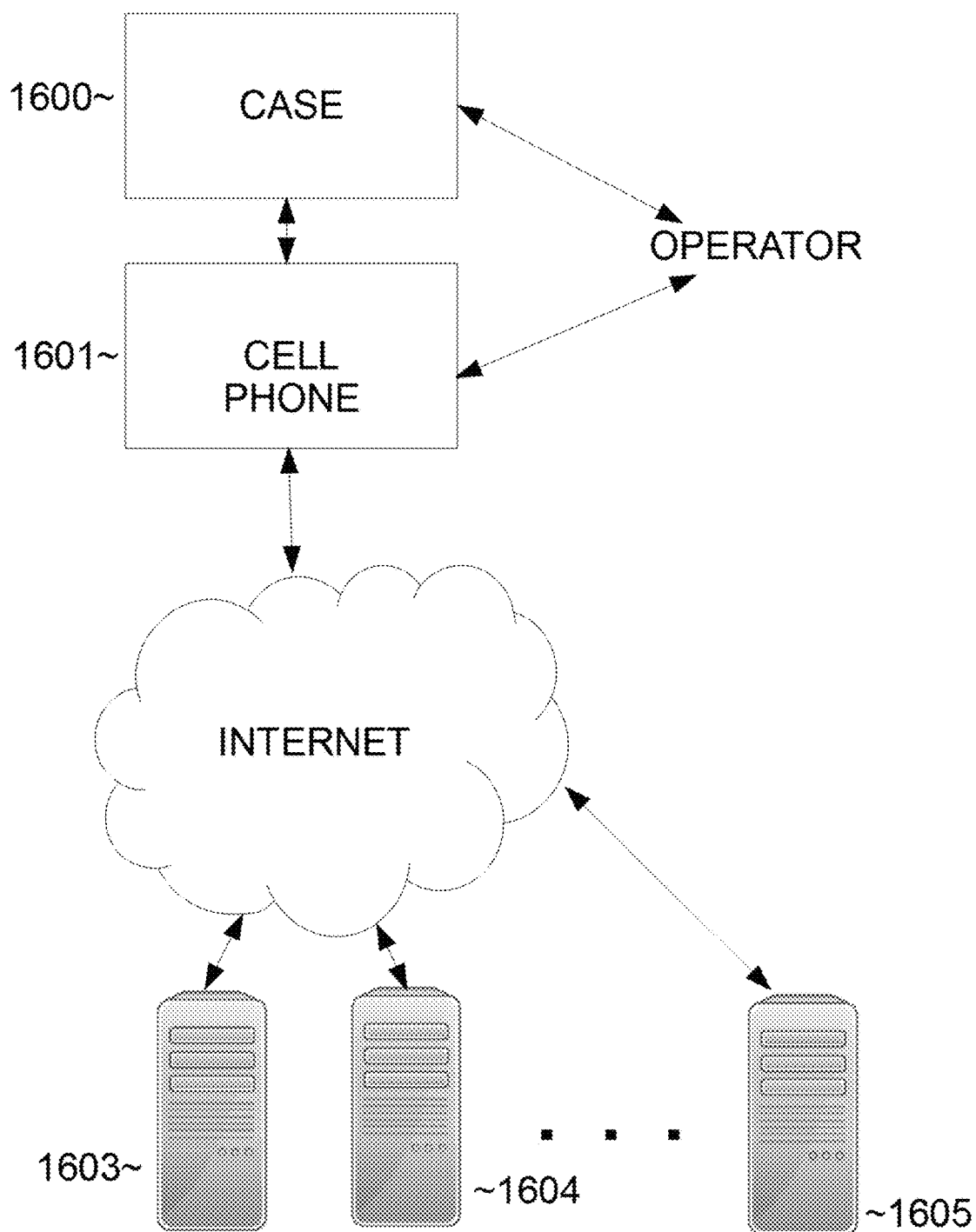
FIG. 16 is a block diagram illustrating an overall system, according to an embodiment.

FIG. 16 is a block diagram illustrating an overall system, according to an embodiment.

FIG. 16 is similar to FIG. 5. The case 1600 is paired to the cell phone 1601 which communicates with the internet. An operator can physically interact with both the cell phone 1601 and the case 1600 since they are in the same general location (inside the same car). Thus, both the case 1600 and the cell phone 1601 can communicate with any of the remote servers 1603, 1604, 1605 and transmit/receive any type of data (mentioned herein or not).

While numerous paradigms have been described and illustrated herein, another paradigm can utilize the flash detection only once to verify that the correct phone is inside the case when it is closed, but does not require continuous flashing of the flash. Also, a number of cell phones (also referred to as "phones") can be paired to the case, and it can be determined via the flash which of the paired phones is actually inside the case.

Figure 17:
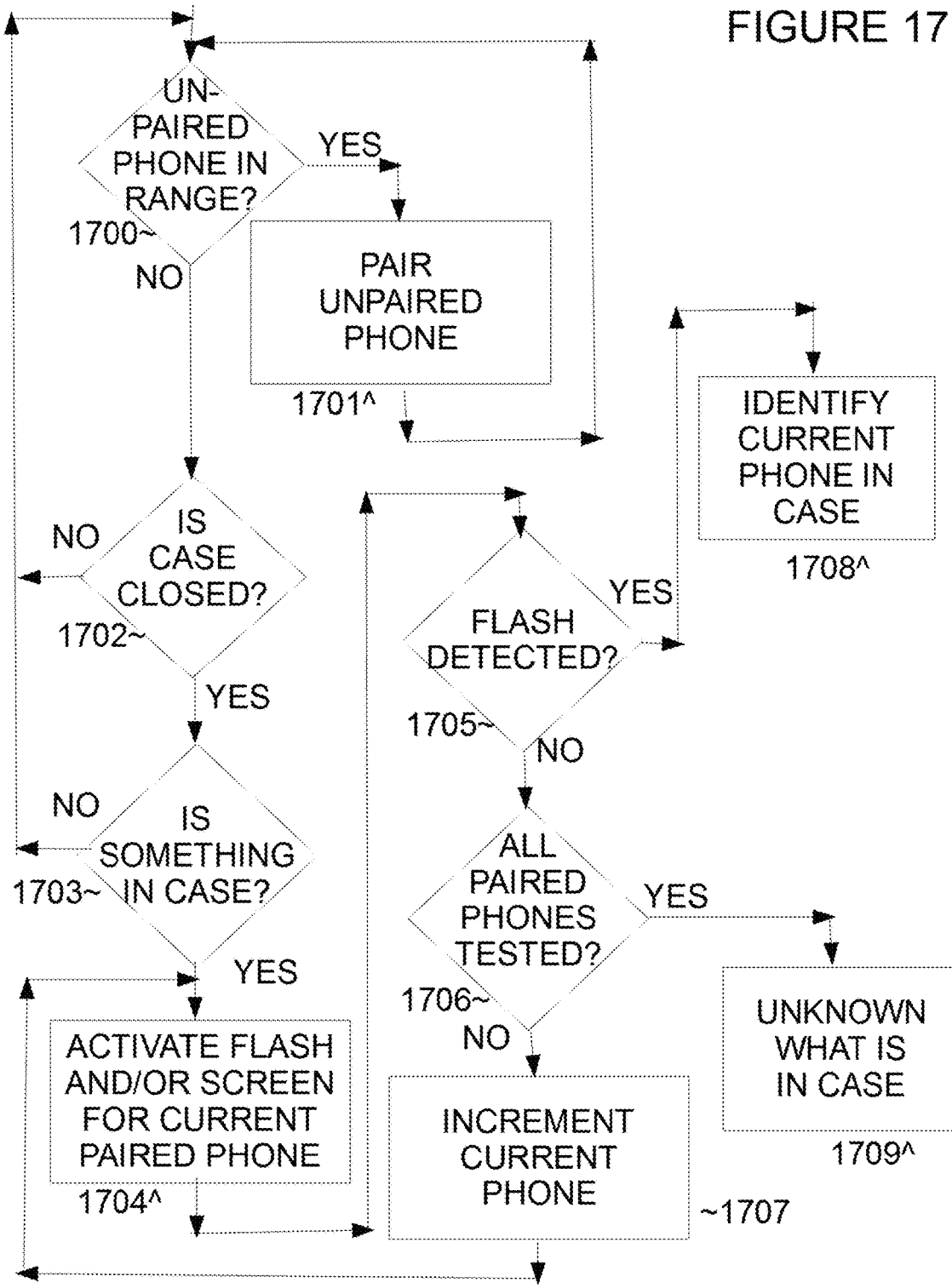
FIG. 17 is a flowchart illustrating an exemplary method of determining whether a particular phone is in its proper case, according to an embodiment.

FIG. 17 is a flowchart illustrating an exemplary method of determining whether a particular phone is in its proper case, according to an embodiment.

The first thing the method does is pair all unpaired phones that are in range of the case. An unpaired phone is a phone that has been identified by the case as in range (e.g., within Bluetooth signal range) and is running the particular software app (which implements the methods described herein) and is seeking to pair with a case (discernable via a transmission protocol). For example, both the case and the phone can send a beacon (via Bluetooth or other wireless transmission method) which can be picked up by the other enabling each to know of the others' presence. There may be a limited range of the beacons (e.g., 5 feet or other range).

If in operation 1700, there is an unpaired phone available, then the method proceeds to operation 1701 which pairs that phone. A paired phone is the unpaired phone after it has been paired, that is, both the phone and the case have acknowledged and registered each-other's presence and are now in communication with each other. The case maintains a list of all phones that it is currently paired with. There is no limit to the number of phones that the case can be paired with, although for practical purposes an upper limit can be set (e.g., 10). The phone would store the identification of the case it is paired to (received via beacon from the case) and knows it is now paired. Being paired to the case, the case can also now control functions on the cell phone, such as activating the phone's flash, displaying images on the cell phone's screen (e.g., a white screen), sending audible sounds (e.g., alarms) to the cell phone's speakers, etc. Being paired means that the case can utilize the cell phone's cell link 1507 to communicate with the Internet. Each paired phone transmits to the case a unique identification code (or number) which are all stored by the case, and each paired phone stores a unique identification code (or number) of the case (received wirelessly from the case). The time, date, location, etc., of each pairing can also be stored by each paired cell phone and the case. This data can also be transmitted to a remote server where it is stored. From operation 1701, the method returns to operation 1700, to continue to pair any other phones that may be in range.

If in operation 1700, it is determined that there isn't another unpaired phone in range, then the method proceeds to operation 1702.

Note that in operations 1700 and/or 1701, when a paired phone is unpaired (each taken out of range, the software on the phone stops running, etc.), then the phone would be automatically removed from the list maintained by the case of all paired phones. The case would maintain a real time list of all currently paired phones.

From operation 1700, the method proceeds to operation 1702, which determines whether the case is closed. This can be done for example by communicating with the open/close detector(s) 1502 which can transmit a particular signal based on the status of the case (open/closed). As described herein, this can be a circuit connected to a latch which completes a circuit when the latch (and case) is closed, but when the phone is open a different signal (or lack thereof) is transmitted. The open/close detector 1502 can also be circuit connected to a zipper which determines whether the zipper is completely closed (zipped up) which means that case is closed, and if the zipper is not completely closed (not entirely zipped up) which means that the case is not closed. If the case is not closed, then the method can repeat to operation 1702 which will wait until the case is closed.

If in operation 1702, it is determined that the case is closed, then the method proceeds to operation 1703, which determines whether something is inside the case. This can be determined from the weight sensor 1503. If something is inside the case (of significant enough weight), then the weight sensor 1503 would be tripped and send a respective signal, otherwise the weight sensor 1503 would not be tripped and would not send a different signal than its default signal (signifying nothing is in the case). If nothing is in the case (via querying the weight sensor or some other sensor inside the case which can detect the presence of an object), then the method can return to operation 1700 in which the case can thereafter be opened by the operator and something can then be put inside the case).

If in operation 1703, it is determined that there is something inside the case, then the method proceeds to operation 1704 which determines whether a current phone is inside the case. If this is the first time operation 1704 is being performed, then the current phone would be considered the first paired phone in the list of paired phones maintained by the case in operation 1701. Initially, the case should turn off the screen on the current phone and make sure the flash is not activated on the current phone, and then confirm that no light is detected inside the case by the photo detector(s) 1301. If there is light detected, then it can be concludes that the current phone is not inside the case (because inside the case should be dark) and then the method would proceed to operation 1707.

After it is confirmed that it is dark inside the case, then the current cell phone's flash can be activated. In addition to activating the cell phone's flash, the cell phone's screen can also be controlled to display a white screen (a solid white on all or most pixels on the cell phone's screen) simultaneously while the flash is activated. The white screen would serve to illuminate the inside of the case in addition to the flash being activated. Since the flash on a cell phone is typically on the opposite side of a cell phone than the screen, by activating the flash and displaying a white screen on the cell phone's screen simultaneously could illuminate both sides of the case and more reliably trigger any sensor(s) inside the case than merely flashing the flash alone or displaying the white screen alone. The case can have two photodetectors, one on the top inside of the case and the other on the bottom inside of the case. In this manner, the flash can be detected by one photodetector and the white screen can be detected by the other photodetector. Typically, only one light burst (e.g., flash or white screen) need be detected by any of the photodetectors in order to be considered as a flash detection. The activation of the cell phone's flash and screen can be accomplished by the case sending signals to the software (app) running on the cell phone whereby the case can control the cell phone to activate the cell phone's flash and screen (by virtue of them being paired). Each particular phone can be addressed by the case via an IP address or other unique identifier so the case can only activate the current phone's flash (and screen) but not affect the other paired phones.

From operation 1704, the method proceeds to operation 1705, which determines whether the flash from operation 1704 is detected. This would include any light inside the case and as such if a white screen is displayed inside the case this could also be what can be detected in operation 1705 (and any other operation herein which detects occurrence of the flash). The detection can be done by any photodetector inside the case (e.g., if there are two photodetectors, only one need detect the light to be a "yes" detection). The timing of the detection 1705 can be coordinated with the time that the flash (or white screen) is activated in operation 1704 as described herein so that if there is too much of a delay between the flash activation (or white screen) and the flash detection (e.g., the delay is greater than a predetermined threshold) then this would not be considered a detection of the flash.

If no light burst (e.g., flash or white screen) is detected in operation 1705, then it is determined that the current phone is not in the case and the method proceeds to operation 1706.

In operation 1706, it determines whether all paired phones (phones paired to the case) have been tested (had their flashes activated). The case can maintain a sequential list of all currently paired phones, and if the current phone is the last phone on the list then it would be determined that all paired phones have been tested (e.g., if three phones are paired to the case and all three phones have been tested). If all paired phones (phones on the case's paired phone list) have been tested, then the method proceeds to operation 1709.

In operation 1709, it is not known what is inside the case. It can possibly be a "dummy phone" or something a driver placed inside to try to trick the case into thinking a phone is inside. Typically, in operation 1709, an alert would be triggered. The alert can be both a local alert (e.g., an alarm can ring on the case) as well as a remote alert (the remote server would store the particular case involved, date, time, location, etc.) so the matter can be investigated further.

If in operation 1706, it is determined that all paired phones have not yet been tested (e.g., the current phone is not the last phone on the list of paired phones), then the method proceeds to operation 1707. In operation 1707, the current phone can be incremented to the next phone on the case's paired phone list. The current phone can be a pointer (or simply an integer value) pointing to the current phone on the paired phone list. After the current phone is incremented (or changed to point to a successive phone on the paired phone list), then the method would return to operation 1704.

If in operation 1706, a flash is detected (e.g., the photo detector(s) 1301) detect a light that is brighter than a predetermined threshold without more than a predetermined delay from the flashing operation, then the method proceeds to operation 1708.

In operation 1708, it has been identified that the current phone is the phone inside the case. The case can now store the unique identifier of the current phone so the case knows now which phone to communicate with further. The identification of the cell phone inside the case can now be transmitted by the case to the remote server (along with the time, date, location, case identification, current cell phone identification, etc.) so that the remote server now stores the identification of the cell phone inside the case. The case can utilize the cell phone's cellular link 1507 to communicate to and from the remote server. From operation 1708, the method can proceed to operation 1800. Now that the system knows which particular phone is in the case, the system will trigger an alert when the case is opened and the car is in motion.

In one embodiment, only one phone can be in the case at any one time. In another embodiment, more than one phone can fit inside the case at the same time. Thus, multiple phones (e.g., 2 or more) would be paired to the case and inside the case at the same time. In this embodiment, from operation 1708, the method proceeds to operation 1706. In this way, all paired phones are flashed (in sequence) to determine which of the paired phone(s) are actually present inside the case.

Figure 18:
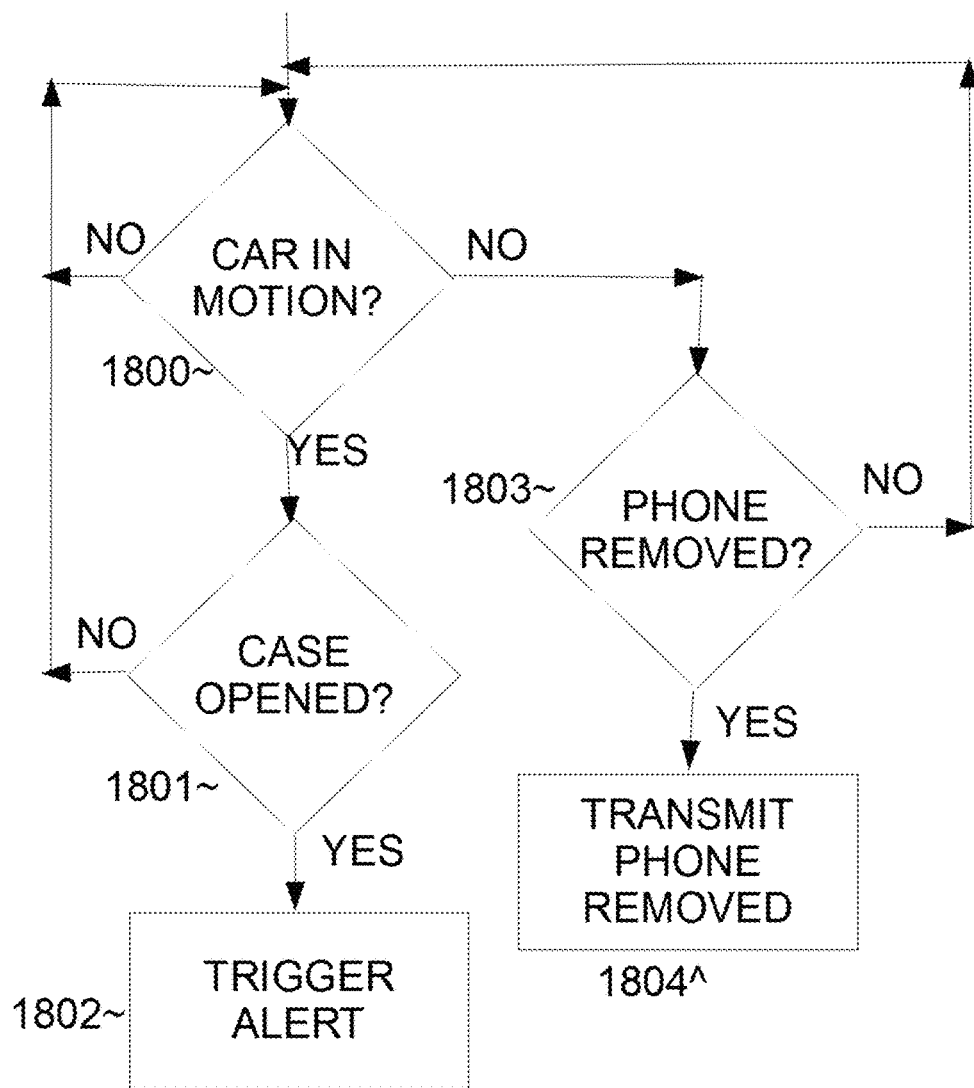
FIG. 18 is a flowchart illustrating an exemplary method of triggering an alert, according to an embodiment.

FIG. 18 is a flowchart illustrating an exemplary method of triggering an alert, according to an embodiment. In FIG. 18, typically it has already been determined that a particular (current) cell phone has been placed in its respective case. The operator (owner of the cell phone) can drive safely.

In operation 1800, it is determined whether or not the cell phone is in motion. This can be determined via the GPS

1506 sensor on the cell phone (in FIG. 18, "cell phone" refers to the cell phone now inside the case), by comparing successive positions (which can be returned in the form of coordinates) to determine if the cell phone's position is changing by more than a significant distance (e.g., 10 feet) after a short amount of time (e.g., five seconds, etc.) If the cell phone is not in motion, then the method returns to operation 1800 which repeats this determination. The case can access the GPS information from the cell phone inside the case and make this determination.

If in operation 1800, it is determined that the cell phone is in motion, then the method proceeds to operation 1801, which determines whether or not that case is opened. This can be determined by the open/close detector(s) 1502 as described herein. The case should typically be closed for proper operation of the system (since the operator is driving the case should remain close so the cell phone cannot be utilized by the operator). If the case remains closed (not opened), then the method returns to operation 1800.

If in operation 1801, the case is opened, then the method proceeds to operation 1802, which triggers an alert. The alert can be implemented as described herein. The alert can be, for example a local alert and/or a remote alert. The local alert would trigger a local alarm, such as playing a loud noise on the cell phone. The remote alert would transmit all of the relevant information regarding the alert (e.g., time, date, location, cell phone identification, case identification, etc.) to the remote server so the remote server can record all of this information so it can be retrieved later. The case can utilize the cell phone's cell link 1507 to communicate this information (and any other) to the remote server. This information can be used in numerous ways. For example, the operator's employer can be presented with all employees who triggered alerts, so that those employees can face some sort of penalty/punishment.

In operation 1800, if the car is not in motion, then the method proceeds to operation 1803, which determines if the phone is removed (e.g., using the weight sensor 1503). If the phone is not removed, then the method can return to operation 1800.

If in operation 1803, it is determined that the phone is removed, then the method proceeds to operation 1804, which then transmits to the remote server (via the cell link 1507) that the cell phone has been removed from the case (along with the location, time, date, etc.). This data can be stored in the remote server as part of the particular cell phone's and case's history.

Figure 19:
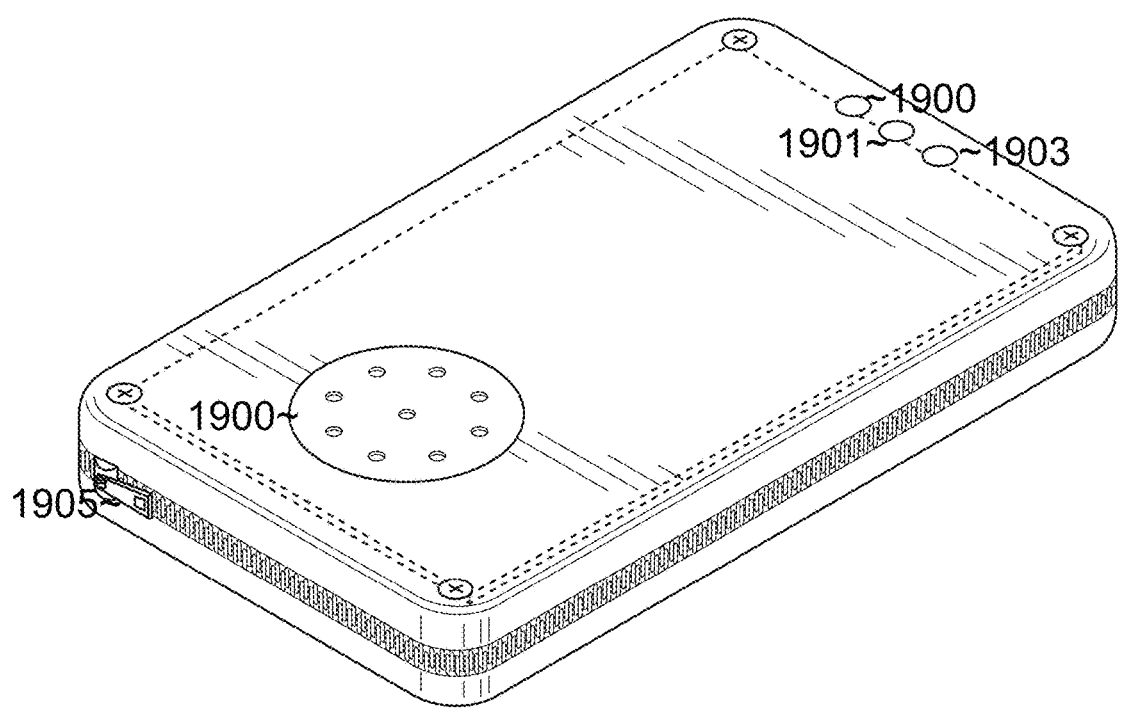
FIG. 19 is a drawing of a closed cell phone case, according to an embodiment.

FIG. 19 is a drawing of a closed cell phone case, according to an embodiment.

A set of LEDs 1900, 190, 1903 can be used to display the status of the case. For example an illuminated yellow LED can signify low battery. An illuminated red LED can signify that there is no paired phone inside the closed case, in other words, it is not safe to drive. An illuminated green LED can signify that a paired phone is inside the closed case. If the respective LED is not lit, then the condition would not be true. Note that any color or identifier of each LED can be used.

A speaker 1900 is used to broadcast audible alerts, such as when an alert is triggered (for example the case is opened with a paired phone inside while the vehicle is driving). A zipper 1905 is used to open and close the case.

Figure 20:
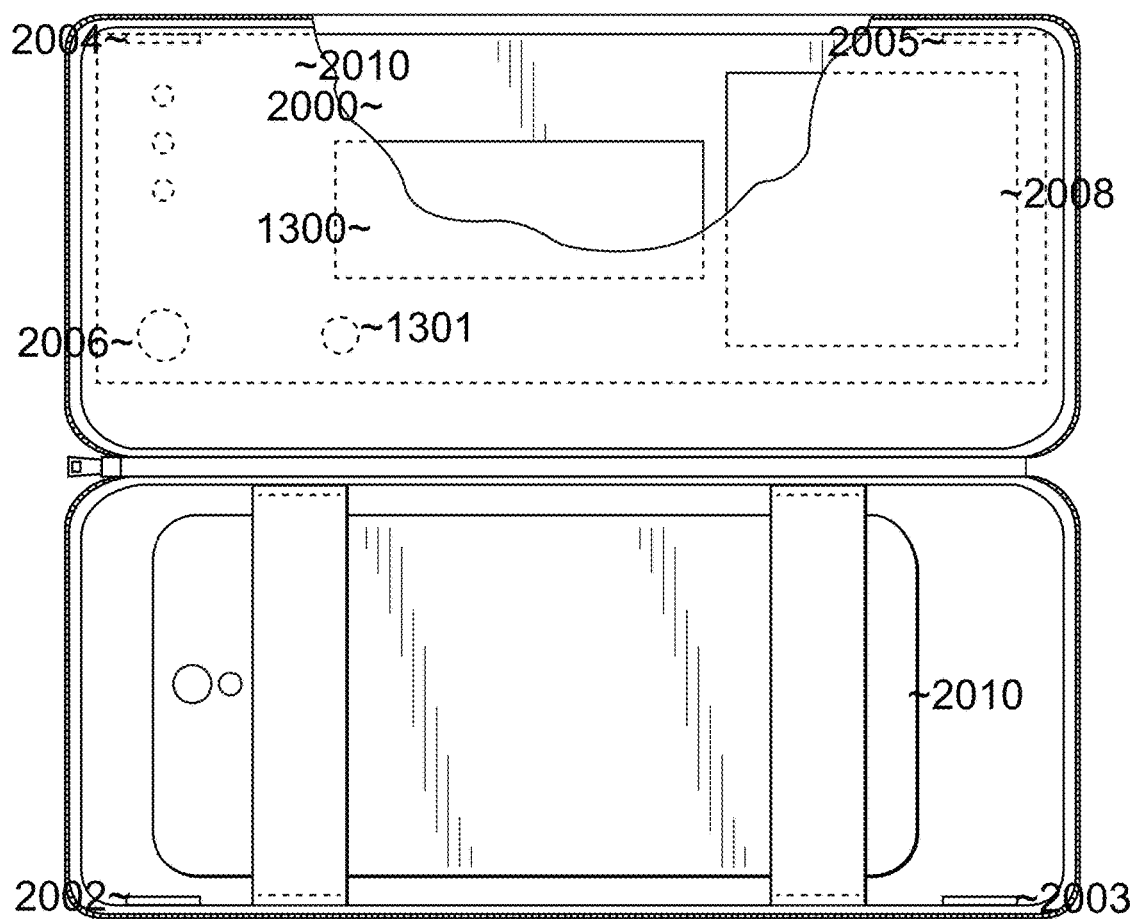
FIG. 20 is a drawing of an open cell phone case, according to an embodiment.

FIG. 20 is a drawing of an open cell phone case, according to an embodiment.

A cell phone 2010 is inside the case. A first magnet 2002 corresponds to a first magnetic switch 2004 (magnet detector such as a Hall Effect sensor). Thus, when the case is closed, the first magnet 2002 is detected by the first magnetic switch 2004. A second magnet 2003 corresponds to a second magnetic switch 2005 (magnet detector such as a Hall Effect sensor). Thus, when the case is closed, the second magnetic 2003 is detected by the second magnetic switch 2005. Thus, when both magnetic switches 2004, 2005 detect their corresponding magnets 2002, 2003, then it is determined that the case is closed. If both magnetic switches 2004, 2005 do not detect their corresponding magnets 2003, 2003, then it is determined that the case is opened. The actual determination can be determined by convention hardwired circuits or the case processing unit 1300 can make this determination.

A photodetector 1301 can be used to detect a flash of the cell phone 2010, as described herein. Photodetector 1301 can be considered the same as photodetector 610. There can be one or more such photodetector(s) 1301 placed in different locations inside the case (e.g., one on the top section of the case and one on the bottom section of the case). The top section of the case is the portion shown above the zipper and the bottom section of the case is the portion shown below the zipper. All photodetector(s) 1301 (as well as any other electrical component described herein) can be connected (directly or indirectly) to the case processing unit 1300. A buzzer 2006 can be used to generate sound when an alert is triggered. A battery 2008 powers the case processing unit 1300 and any other electrical component inside the case.

The electrical components of the case can all be present on and connected via a printed circuit board 2000 which can be located on the top section of the case and may be covered by a cloth 2010. Also shown above the buzzer 2006 is the bottom of the three LEDs shown in FIG. 19.

In a further embodiment, the case can also have a detector which can detect cell phone signals inside the car. This can prevent the scenario where a driver takes an additional cell phone into his vehicle, and then closes his primary cell phone inside the case but uses his additional cell phone while the driver is driving. A detector (e.g., an RF signal detector) can be inside the case which can detect the presence of cell phone signals emanating from a predetermined range (e.g., 5 feet or other distance). If there are other such cell phone signals present (excluding any cell phone signals coming from the cell phone that is currently in the case) then this can trigger an alert because the driver may be utilizing another cell phone than what is inside the case.

Figure 21:
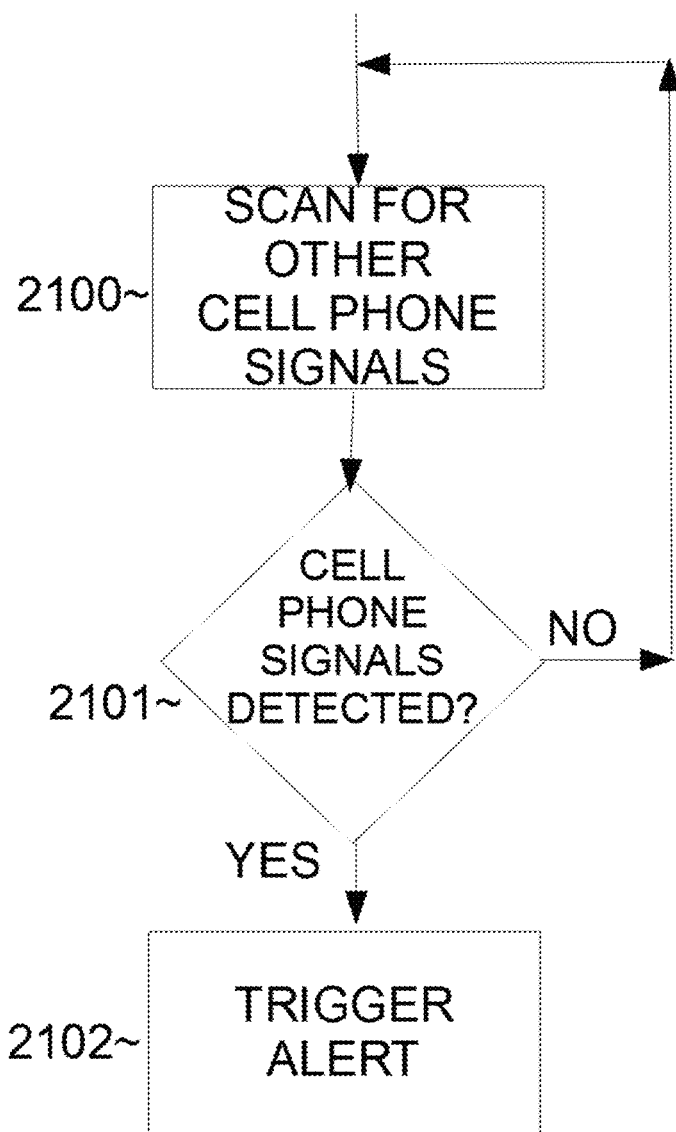
FIG. 21 is a flowchart illustrating an exemplary method of checking for other cell phones in the vehicle, according to an embodiment.

FIG. 21 is a flowchart illustrating an exemplary method of checking for other cell phones in the vehicle, according to an embodiment.

In operation 2100, a local cell phone signal detector (located inside or adjacent to) the case is scanning for cell phone signals. Only signals of at least a predetermined strength (e.g., range) would count so as not to detect cell phone signals coming from outside the vehicle (or even in the back seat of the same vehicle). Any cell phone signals that are emanating from the cell phones paired inside the case are not counted (e.g., they are ignored), those only signals from other cell phones (not inside the case) are relevant.

From operation 2100, the method proceeds to operation 2101, which determines whether a cell phone signal (which has originated from a predetermined distance from the case as judged by the signal's strength) has been detected (which is not a signal from a paired cell phone inside the case). If no such signal has been detected, then the method returns to operation 2100 which continues scanning for cell phone signals.

If in operation 2101, it is determined that a cell phone signal has been detected which has originated from within a predetermined distance from the case (referred to as a local cell phone signal, e.g., within five feet from the case) which does not originate from a cell phone inside the case (the case maintains a list of all current paired phones inside the case), then the method proceeds to operation 2102 which triggers an alert. The alert can be both a local alert and a remote alert. As a local alert, an audible alarm can be sounded (generated by the case and/or the cell phone inside the case) to warn the driver to turn off his/her additional cell phone (preferably putting it in airplane mode so it will not generate any additional signals). A remote alert would transmit relevant data to the remote server which would be stored. The relevant data could comprise (but not limited to) the physical location of the vehicle when this alert was generated (ascertained by the paired cell phone inside the case GPS), the time, date, identification of the driver, identification of the paired cell phone, etc. The system may not be able to ascertain an identity of the additional cell phone generating the signals that were detected. All of this relevant data would be stored by the remote server so that later on an employee of the company employing the driver (or anyone else with an interest in viewing the driver's history) can pull up the driver's log and see that the alert was generated along with the relevant information. The driver may face some negative consequences from his/her employer regarding the alert but of course that would be up to the employer. Operation 2102 can operate in the same manner as operation 1802.

The method illustrated in FIG. 21 is optional and can be running simultaneously while the vehicle (also referred to herein as "car") is in motion (e.g., between operations 1801 and 1800). For example, in operation 1801 if the case is not opened then instead of going to operation 1800 the method would check for local cell phone signals and if no such signals are detected then the method would proceed to operation 1800 and if local cell phone signals are detected then the method would proceed to operation 1802.

At any point the time is transmitted (or any status update) to a remote server, this can also include the date as well, as well as any other relevant data, such as the location of the cell phone, or any other data that is described herein (or not described herein but known in the art). All data transmitted can be recorded and indexed in a database for later retrieval.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A cellular device monitoring apparatus, comprising:
    a case comprising at least one photodetector configured to emit at least one signal, based on light detection which comprises a flash on a cell phone, the case configured to house the cell phone;
    one or more electronic processors configured to activate the flash on the cell phone, receive the at least one signal from the photodetector, and determine whether the cell phone is inside the case based on the at least one signal.

2. The cellular device as recited in claim 1, further comprising:
    a transmitter controlled by the one or more electronic processors which is programmed to transmit a status signal to a remote server representing a status set comprising presence and absence of the cell phone inside the case based on the determine operation.

3. The apparatus as recited in claim 1, wherein the one or more electronic processors are configured to continuously activate the flash after a predetermined period of time elapses.

4. The apparatus as recited in claim 1, wherein the case further comprises a sensor configured to determine whether the case is opened or closed.

5. The apparatus as recited in claim 1, wherein the case further comprises a vehicle status detector configured to detect between a vehicle containing the case being stationary and moving.

6. The apparatus as recited in claim 5, wherein the vehicle status detector is a GPS device.

7. The apparatus as recited in claim 5, wherein the one or more electronic processors are further configured to trigger an alert when it is determined that the cell phone is not inside the case and the vehicle status detector detects moving.

8. The apparatus as recited in claim 7, wherein the one or more electronic processors are further configured such that the alert comprises storing a current time the alert was generated in a database.

9. The apparatus as recited in claim 7, wherein the one or more electronic processors are further configured such that the alert generates an audible alarm.

10. The apparatus as recited in claim 7, wherein the one or more electronic processors are further configured such that the alert causes the one or more electronic processors to send a wireless message to a particular device.

11. The apparatus as recited in claim 7, wherein the one or more electronic processors are further configured such that the alert causes the one or more electronic processors to transmit a wireless message to a remote server, the wireless message indicating the alert.

12. The apparatus as recited in claim 1, wherein the cell phone has an app installed which enables the activation of the flash.

13. The apparatus as recited in claim 1, comprising a remote server configured to store a continuous stream of data comprising device status data representing whether the cell phone is present inside the case while closed and vehicle status data representing a status between stationary and moving.

14. The apparatus as recited in claim 1, wherein one of the one or more electronic processors is a processor located on the case.

15. The apparatus as recited in claim 1, wherein one of the one or more electronic processors is a processor controlling the cell phone.

16. The apparatus as recited in claim 1, wherein one of the one or more electronic processors is a processor on a remote server.

17. A method, comprising:
    providing a case comprising a photodetector for detecting light including flash from cell phones;
    enabling the case to pair to all cell phones within range of the case;
    determine that the case is closed;
    execute a program that sequentially activates a flash for the all cell phones paired to the case until a corresponding flash is detected inside the case; and
    identify a cell phone currently inside the case as one of the all cell phones with the corresponding flash.

18. The method as recited in claim 17, wherein the case detects changes in light levels by the photodetector immediately before the flash activation in addition to immediately after the flash activation.

19. The method as recited in claim 17, further comprising:
executing a program that continuously determines whether a vehicle containing the case is in motion, and continuously checks whether the case is opened, and if both the vehicle is in motion and the case is opened then an alert is triggered.

20. The method as recited in claim 17, further comprising storing by a remote server a continuous stream of data comprising device status data representing whether the identified cell phone is present inside the case while the case is closed and vehicle status data representing a status between stationary and moving.

21. The method as recited in claim 17, further comprising, providing an app which is installed on the identified cell phone which enables the activating the flash on the identified cell phone.

22. The method as recited in claim 17, the providing a case further provides that the case is large enough to fit more than one phone.

* * * * *